United States Patent
Nakano et al.

(10) Patent No.: US 11,372,078 B2
(45) Date of Patent: Jun. 28, 2022

(54) WIRELESS COMMUNICATION DEVICE

(71) Applicant: Panasonic Intellectual Property Corporation of America, Torrance, CA (US)

(72) Inventors: Kosei Nakano, Kanagawa (JP); Masataka Irie, Kanagawa (JP); Takenori Sakamoto, Kanagawa (JP); Hiroyuki Motozuka, Kanagawa (JP); Kazuaki Takahashi, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 595 days.

(21) Appl. No.: 16/381,062

(22) Filed: Apr. 11, 2019

(65) Prior Publication Data
US 2019/0377058 A1 Dec. 12, 2019

(30) Foreign Application Priority Data

Jun. 8, 2018 (JP) .............................. JP2018-110569

(51) Int. Cl.
*G01S 5/10* (2006.01)
*H04B 17/26* (2015.01)
(Continued)

(52) U.S. Cl.
CPC .............. *G01S 5/10* (2013.01); *H04B 7/0639* (2013.01); *H04B 7/088* (2013.01); *H04B 17/26* (2015.01); *H04B 17/27* (2015.01)

(58) Field of Classification Search
CPC ........... G01S 5/10; H04B 17/26; H04B 17/27; H04B 7/0639; H04B 7/088; H04B 7/0695;
(Continued)

(56) References Cited

U.S. PATENT DOCUMENTS

2001/0019307 A1 9/2001 Sato et al.
2016/0047884 A1 2/2016 Zhang et al.
(Continued)

FOREIGN PATENT DOCUMENTS

JP 10-040433 2/1998
JP 2001-243512 9/2001
(Continued)

OTHER PUBLICATIONS

Communication pursuant to Article 94(3) EPC dated Mar. 25, 2021 for the related European Patent Application No. 19170068.1, 4 pages.
(Continued)

*Primary Examiner* — Sam K Ahn
*Assistant Examiner* — Amneet Singh
(74) *Attorney, Agent, or Firm* — Seed IP Law Group LLP

(57) ABSTRACT

A wireless communication device for a road side zone includes a wireless communication circuit that forms beams in plural different directions in a time division scheme in an area which includes plural routes. The wireless communication device for a road side zone includes a recording circuit that records time transition in the direction of the beam used by the wireless communication circuit, which forms the beams in the plural different directions in a time division scheme, for wireless communication with a second wireless communication device provided to a mobile apparatus which moves on any of the plural routes.

4 Claims, 21 Drawing Sheets

(51) Int. Cl.
*H04B 17/27* (2015.01)
*H04B 7/06* (2006.01)
*H04B 7/08* (2006.01)

(58) Field of Classification Search
CPC ... H04B 7/0617; H04B 7/086; H04B 7/15564
See application file for complete search history.

(56) References Cited

U.S. PATENT DOCUMENTS

2016/0112112 A1* 4/2016 Lee ............... H04B 7/0834
 375/267
2019/0223174 A1 7/2019 Shimizu et al.

FOREIGN PATENT DOCUMENTS

| | | |
|---|---|---|
| JP | 2003-196692 | 7/2003 |
| WO | 2018/042714 A1 | 3/2018 |
| WO | 2018/054498 A1 | 3/2018 |

OTHER PUBLICATIONS

The Extended European Search Report dated Oct. 24, 2019 for the related European Patent Application No. 19170068.1.

\* cited by examiner

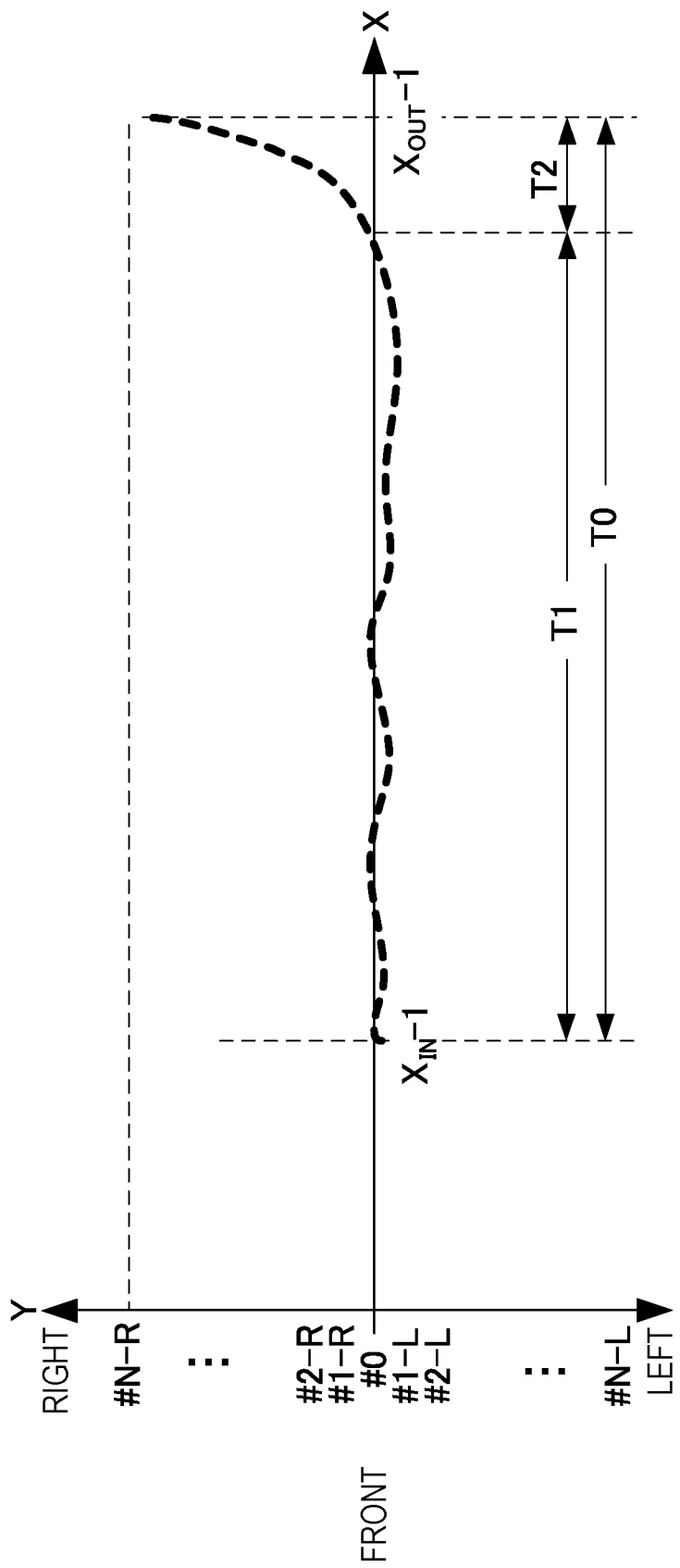

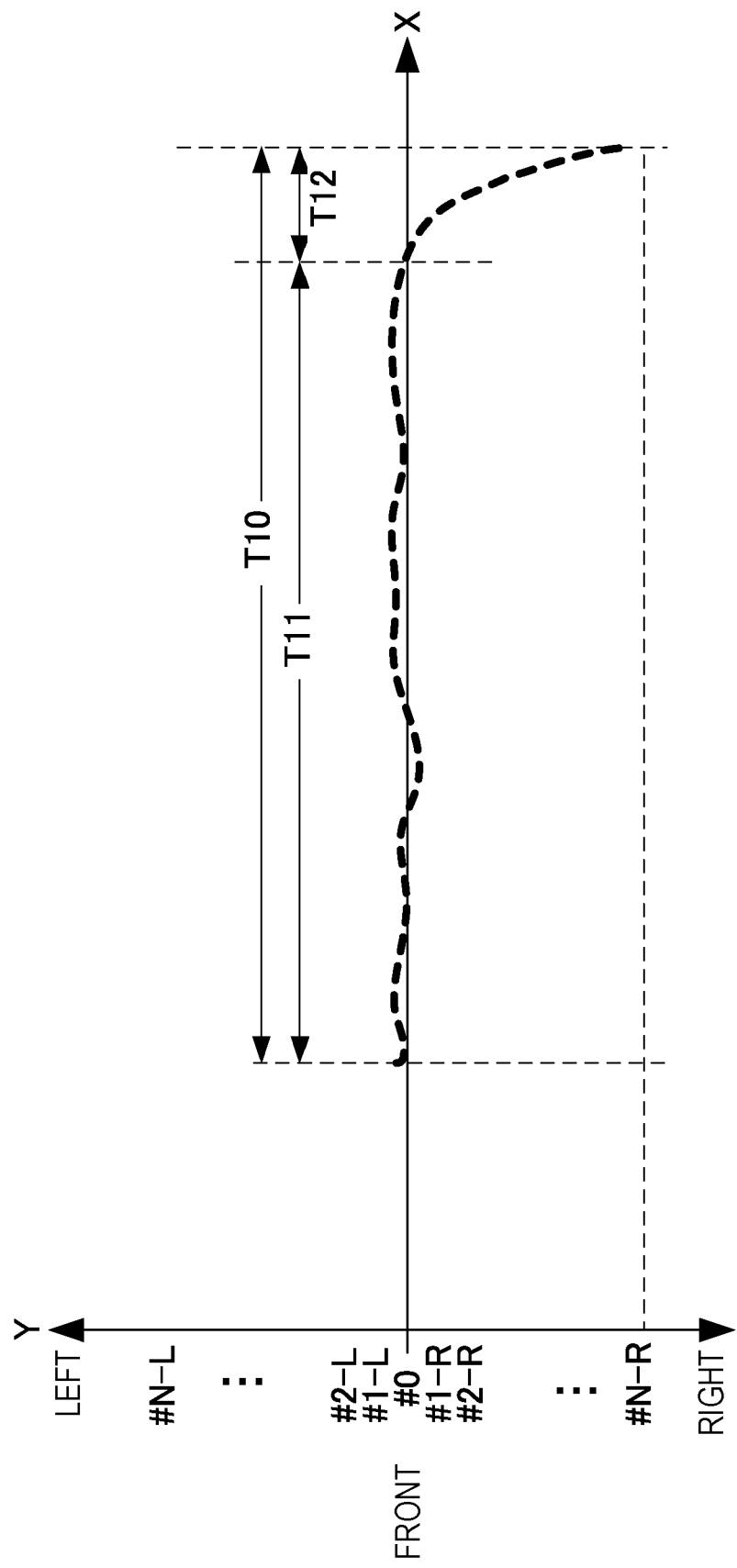

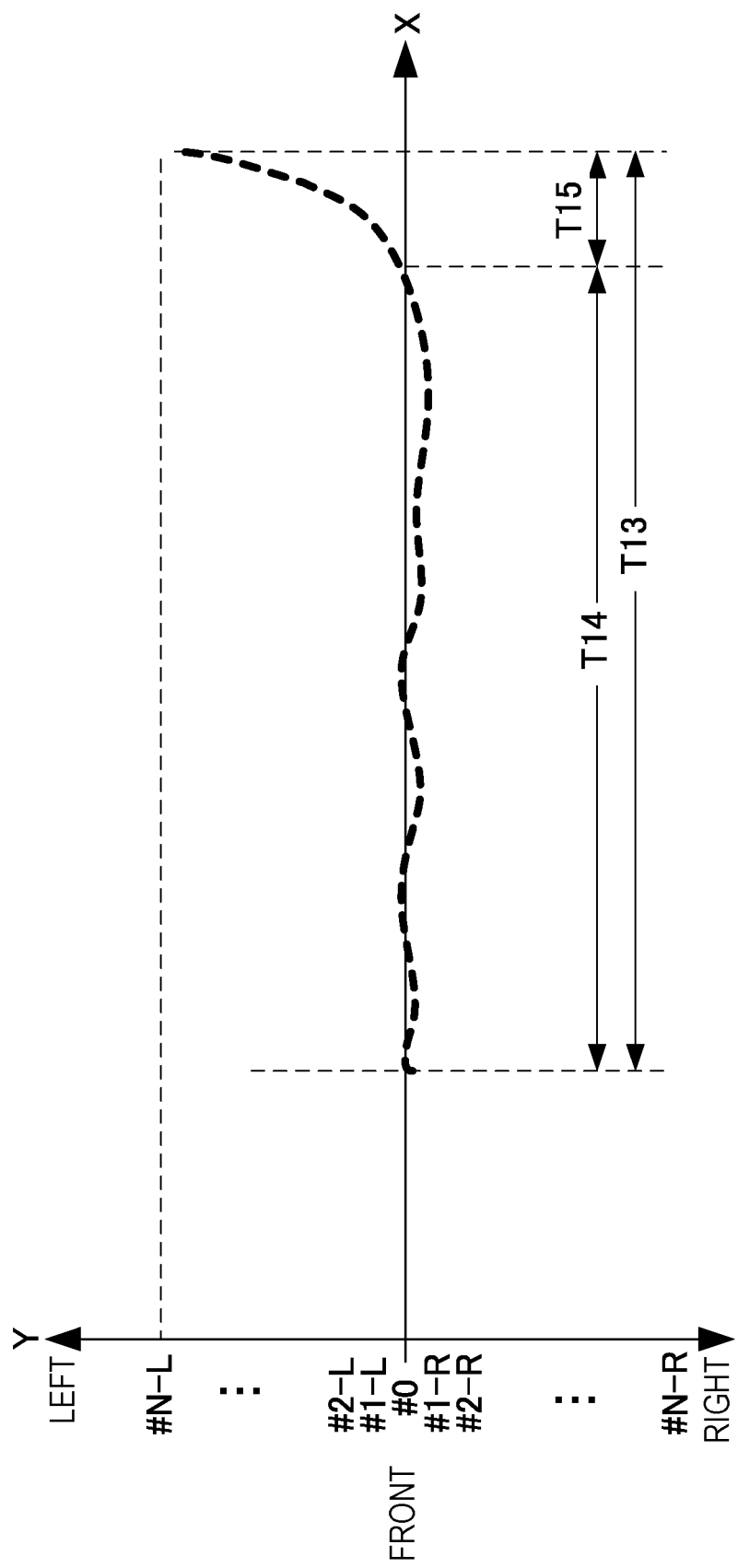

40

WIRELESS COMMUNICATION DEVICE

BACKGROUND

1. Technical Field

The present disclosure relates to a wireless communication device.

2. Description of the Related Art

For example, a system has been discussed in which a wireless communication device placed in mobile apparatuses such as an automobile and/or a railroad vehicle performs wireless communication with a wireless communication device placed in a periphery of a traveling route of the mobile apparatus such as a road and/or a railroad track. For example, the wireless communication device placed in the mobile apparatus is referred to as on-board unit (which will hereinafter be denoted as OBU), and the wireless communication device placed in the periphery of the traveling route is referred to as road side unit (which will hereinafter be denoted as RSU).

In the wireless communication between the OBU and the RSU, various contents corresponding to routes of the mobile apparatus are interchanged. Thus, there are needs for large capacity data communication.

For example, Japanese Unexamined Patent Application Publication No. 10-40433 discloses a system in which a road antenna mounted on a gateway of each route of a highway uses an antenna with sharp directivity, thereby forms a communication region for each route, and performs data communication with in-vehicle equipment mounted on a vehicle which passes through the gateway of each route.

In the system disclosed in Japanese Unexamined Patent Application Publication No. 10-40433, the road antenna is provided to each route and forms the communication region so as to avoid interference with a neighboring route. A vehicle that travels on a different route from the route to which the road antenna is provided does not enter the communication region that is formed by the road antenna. Thus, the data communication corresponding to the route is performed between the road antenna that corresponds to the RSU and the in-vehicle equipment that corresponds to the OBU.

SUMMARY

However, in the system disclosed in Japanese Unexamined Patent Application Publication No. 10-40433, because a road antenna sets a narrow communication region (communication area) so as to avoid interference with a neighboring route, a vehicle passes through the communication area in a short time, and it is difficult to perform large capacity data communication. For example, in a case where the road antenna forms a wide communication region in order to perform large capacity data communication, plural routes are included in the communication region formed by the road antenna, and a vehicle enters each of the plural routes. Thus, it is difficult to distinguish the route on which each of the vehicles travels.

One non-limiting and exemplary embodiment provides a wireless communication device that may assess a route of a mobile apparatus.

In one general aspect, the techniques disclosed here feature a wireless communication device for a road side zone, the wireless communication device including: a wireless communication circuit that forms beams in plural different directions in a time division scheme in an area which includes plural routes; and a recording circuit that records time transition in the direction of the beam which is used by the wireless communication circuit for wireless communication with a second wireless communication device of a mobile apparatus which moves on any of the plural routes.

One aspect of the present disclosure may provide a wireless communication device that may assess a route of a mobile apparatus.

It should be noted that general or specific embodiments may be implemented as a system, a device, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a diagram that illustrates one example of a history of beams formed for the OBU of a mobile apparatus #1 which travels on a route #1 in FIG. 5;

FIG. 16A is a diagram that illustrates one example of a history of beams formed for the RSU by the OBU of the mobile apparatus #1 which travels on the route #1 in FIG. 15;

FIG. 16B is a diagram that illustrates one example of a history of beams formed for the RSU by the OBU of the mobile apparatus #2 which travels on the route #2 in FIG. 15;

DETAILED DESCRIPTION

An embodiment of the present disclosure will hereinafter be described in detail with reference to drawings. Note that the embodiment described in the following is an example, and the present disclosure is not limited by the embodiment.

Figure 1:
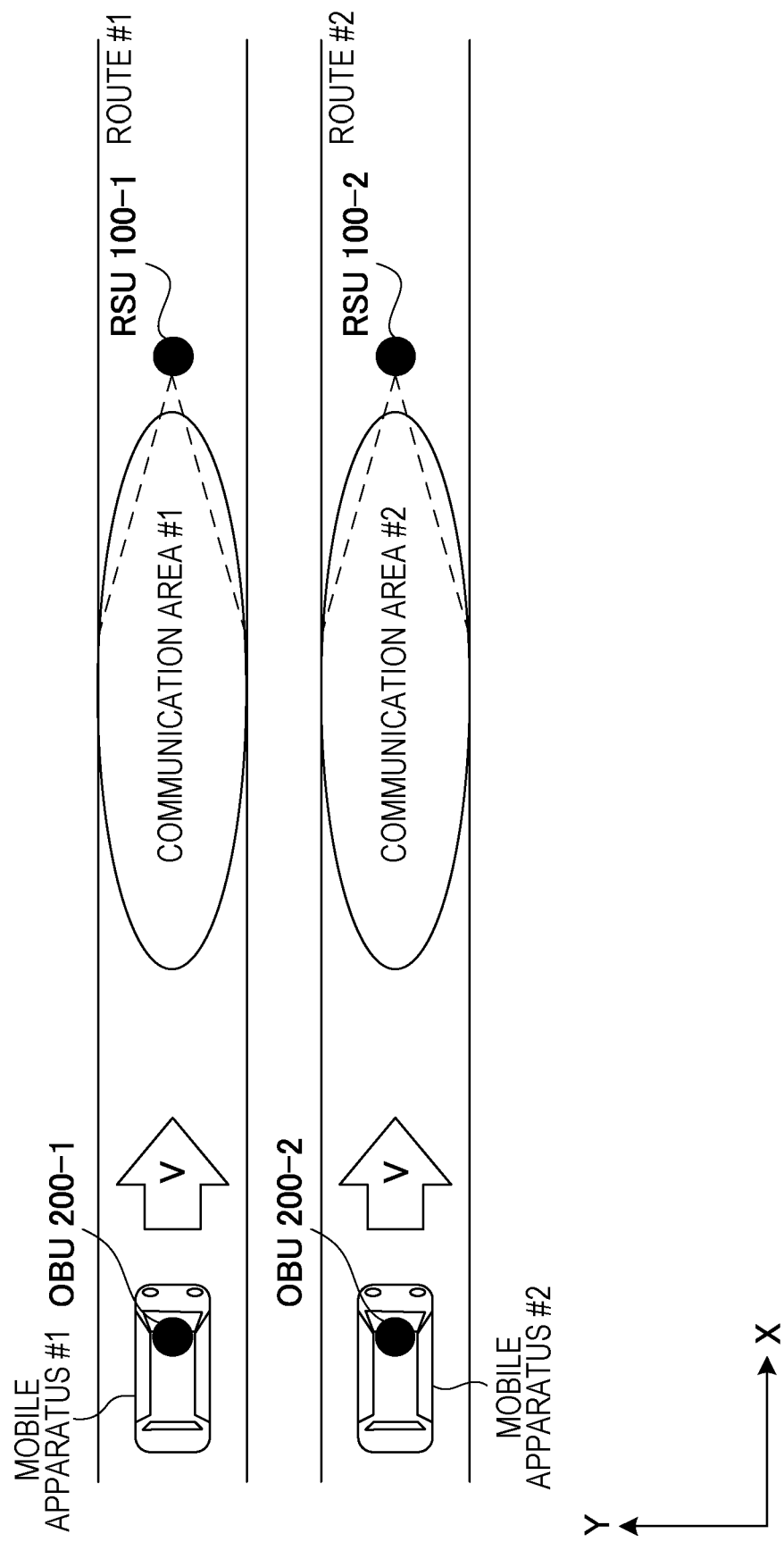
FIG. 1 is a diagram that illustrates one example of wireless communication between an RSU and an OBU.

FIG. 1 is a diagram that illustrates one example of wireless communication between an RSU and an OBU.

FIG. 1 illustrates a route #1 and a route #2 that linearly extend in parallel (run side by side), a mobile apparatus #1 that travels on the route #1 in the direction of arrow V, and a mobile apparatus #2 that travels on the route #2 in the direction of arrow V. The route #1 and the route #2 are roads that linearly extend in parallel, for example. The mobile apparatus #1 and the mobile apparatus #2 are vehicles, for example. Note that the vehicle may include a two-wheeled vehicle and a four-wheeled vehicle.

An RSU 100-1 is a wireless communication device that is installed in the route #1, and an RSU 100-2 is a wireless communication device that is installed in the route #2. Further, an OBU 200-1 is a wireless communication device that is mounted on the mobile apparatus #1, and an OBU 200-2 is a wireless communication device that is mounted on the mobile apparatus #2.

The RSU 100-1 is installed in a higher position than the height of the mobile apparatus #1 in the route #1 and forms a communication area #1, for example. While the mobile apparatus #1 is present in the communication area #1, the OBU 200-1 performs wireless communication with the RSU 100-1.

The RSU 100-2 is installed in a higher position than the height of the mobile apparatus #2 in the route #2 and forms a communication area #2, for example. While the mobile apparatus #2 is present in the communication area #2, the OBU 200-2 performs wireless communication with the RSU 100-2.

The communication area #1 is formed narrowly so as not to include the route #2. Because of the communication area #1, the RSU 100-1 does not perform wireless communication with a mobile apparatus (for example, the mobile apparatus #2) that passes through the route #2 but performs wireless communication with a mobile apparatus (for example, the mobile apparatus #1) that passes through the route #1. Thus, the data communication corresponding to the route is performed.

The communication area #2 is formed narrowly so as not to include the route #1. Because of the communication area #2, the RSU 100-2 does not perform wireless communication with a mobile apparatus (for example, the mobile apparatus #1) that passes through the route #1 but performs wireless communication with a mobile apparatus (for example, the mobile apparatus #2) that passes through the route #2. Thus, the data communication corresponding to the route is performed.

However, because the communication area #1 and the communication area #2 that are illustrated in FIG. 1 are formed narrowly in response to the widths (Y-axis direction) of the route #1 and the route #2, the communication areas #1 and #2 in the regions (X-axis direction) along the route #1 and route #2 are short. Thus, it is difficult to perform large capacity wireless communication. Further, in order to install an RSU 100 in each route, the RSUs 100 as many as the routes have to be installed.

For example, it is possible to expand the communication area of the RSU for performing large capacity wireless communication. However, because the communication area includes plural routes in a case where the communication area is expanded, it becomes difficult to confirm the OBU of the mobile apparatus passing through which route is the OBU as the other party of communication of the RSU.

It is desirable to provide a wireless communication device that assesses a route on which a mobile apparatus travels and may thereby realize data communication corresponding to the route.

One Embodiment

An embodiment of the present disclosure will hereinafter be described in detail with reference to the drawings.
<Wireless Communication System>

Figure 2:
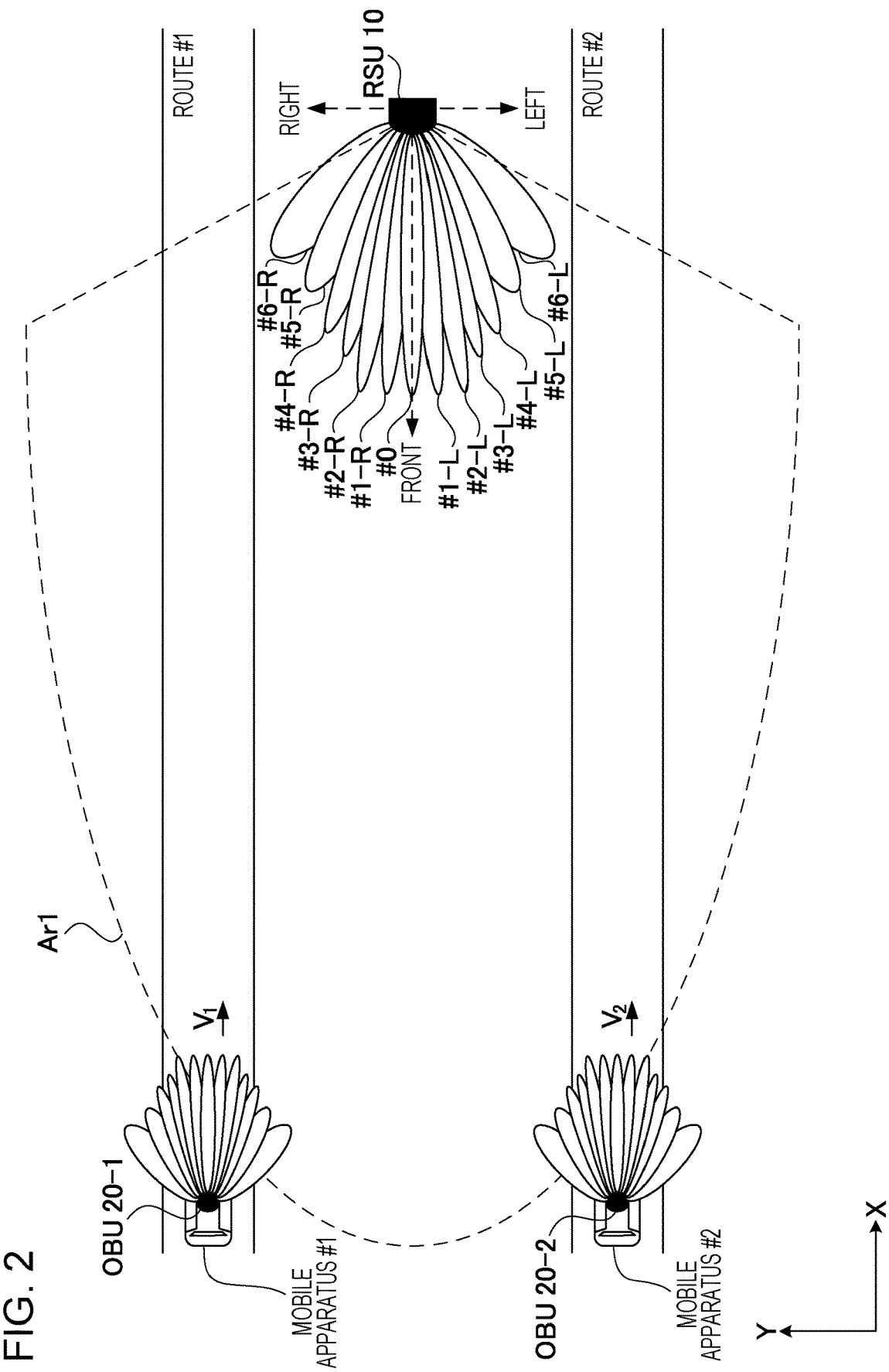
FIG. 2 is a diagram that illustrates a first example of a wireless communication system according to one embodiment of the present disclosure.

FIG. 2 is a diagram that illustrates a first example of a wireless communication system according to this embodiment.

FIG. 2 illustrates a route #1 and a route #2 that linearly extend along the X axis and are parallel with each other, a mobile apparatus #1 that travels on the route #1 at a velocity $V_1$, and a mobile apparatus #2 that travels on the route #2 at a velocity $V_2$. The route #1 and the route #2 are roads that linearly extend in parallel (extend in the X-axis direction), for example. The mobile apparatus #1 and the mobile apparatus #2 are vehicles, for example. A road side zone, a road shoulder, and/or a buffer zone may be provided between the route #1 and the route #2.

Note that a route is a moving road through which the mobile apparatus may move. A route may be referred to as path or way, for example. Further, as described above, for example, in a case where the mobile apparatus is a vehicle, the route may be referred to as road or roadway. Further, as described above, for example, in a case where the mobile apparatus is a railroad vehicle, the route may be referred to as railroad track.

An OBU 20-1 is a wireless communication device that is mounted on the mobile apparatus #1, and an OBU 20-2 is a wireless communication device that is mounted on the mobile apparatus #2. The OBU 20-1 and the OBU 20-2 perform beam sweeping in the horizontal direction with respect to a road surface (for example, through the positive region and negative region of the Y axis, that is, in the direction along road surfaces of the route #1 and the route #2).

An RSU 10 is a wireless communication device for a road side zone, which is installed between the route #1 and the route #2. The RSU 10 covers a communication area Ar1 by performing the beam sweeping in the horizontal direction with respect to the road surfaces. The communication area Ar1 includes a partial section of the route #1 and a partial section of the route #2.

Note that the communication area Ar1 may be different from the communication area #1 and the communication area #2 in FIG. 1 and may be set as a maximum area for the communication ability of the RSU 10 without narrowing the communication area. Thus, the RSU 10 may set a longer communication period than the RSU 100 illustrated in FIG. 1 in the data communication with the OBU 20 and may thus perform large capacity wireless communication.

Beams formed by the RSU 10 are directed in plural directions in the communication area Ar1. In FIG. 2, beams are provided with identifiers (for example, indices).

For example, in FIG. 2, the beam in a front direction is provided with index #0. In FIG. 2, the beams directed in right directions with respect to the front direction (clockwise directions with respect to the front direction as a reference, the positive region of the Y axis) are provided with index #1-R to index #6-R in order from the smallest angle difference from the beam of index #0. In FIG. 2, the beams directed in left directions with respect to the front direction (counterclockwise directions with respect to the front direction as a reference, the negative region of the Y axis) are provided with index #1-L to index #6-L in order from the smallest angle difference from the beam of index #0.

Note that FIG. 2 illustrates an example where the RSU 10 forms beams in 13 directions. However, the present disclosure is not limited to this. For example, in a case where the RSU 10 forms beams in 2N+1 (N is an integer that is one or greater) directions, the beams directed in right directions with respect to the front direction are provided with index #1-R to index #N-R in order from the smallest angle difference from the beam of index #0. Further, the beams directed in left directions with respect to the front direction are provided with index #1-L to index #N-L in order from the smallest angle difference from the beam of index #0. Note that the directions of the beams formed by the RSU 10 are not limited to odd numbers but may be even numbers.

Note that in the following, the beam provided with index #0 may be referred to as beam #0. The same applies to beams provided with other indices.

The front direction is a reference direction along the route #1 and the route #2, for example. Further, as illustrated in FIG. 2, the front direction may be the direction along the straight line that indicates the border which divides the communication area Ar1 into two. Note that in FIG. 2, the negative direction of the X axis is the front direction.

<Configuration of RSU>

Figure 3:
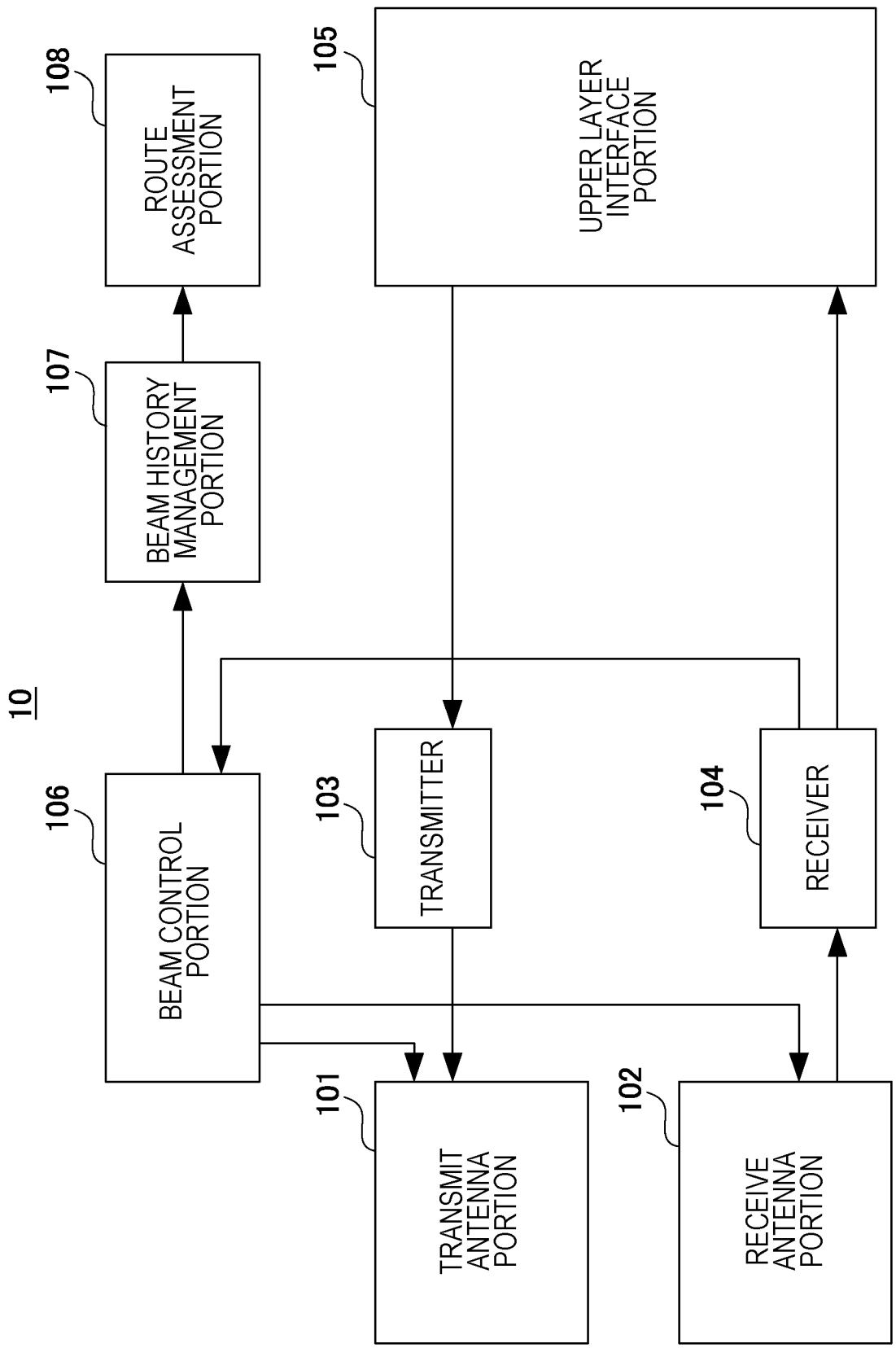
FIG. 3 is a diagram that illustrates one example of a configuration of the RSU according to one embodiment of the present disclosure.

FIG. 3 is a diagram that illustrates one example of a configuration of the RSU 10 according to this embodiment. The RSU 10 includes a transmit antenna portion 101, a receive antenna portion 102, a transmitter 103, a receiver 104, an upper layer interface portion 105, a beam control portion 106, a beam history management portion 107, and a route assessment portion 108.

The transmit antenna portion 101 forms beams in plural directions in accordance with the control by the beam control portion 106 and transmits a data signal that is acquired from the transmitter 103 or a beacon signal that is acquired from the beam control portion 106.

The receive antenna portion 102 forms beams in plural directions in accordance with the control by the beam control portion 106 and receives a signal. The receive antenna portion 102 outputs a received signal to the receiver 104. The received signal includes a data signal transmitted by the OBU 20 or a control signal transmitted by the OBU 20 (for example, a beacon signal or a response signal), for example.

Note that the transmit antenna portion 101 and the receive antenna portion 102 may collectively be denoted as antenna portion.

Note that the transmit antenna portion 101 and the receive antenna portion 102 sweep beams in the horizontal direction, for example. For example, a function of forming beams in plural directions (beamforming function) may be realized by a phased array antenna that controls the direction of an electrical wave by controlling the phases of plural transmitted waves (or received waves) or may be realized by a sector antenna that controls the direction of an electrical wave by switching sectors.

Further, the transmit antenna portion 101 and the receive antenna portion 102 may not separately be provided. For example, in a case where time division duplex (TDD) is used as a wireless communication scheme, one antenna portion may be shared in transmission of a signal and reception of a signal.

The transmitter 103 applies a transmission process that includes coding, modulation, and frequency conversion (up-conversion) to data acquired from the upper layer interface portion 105 and generates a data signal. The transmitter 103 outputs the generated data signal to the transmit antenna portion 101.

The receiver 104 applies a reception process that includes frequency conversion (down-conversion), demodulation, and decoding to a data signal acquired from the receive antenna portion 102 and generates received data. The receiver 104 outputs the received data to the upper layer interface portion 105.

The receiver 104 applies a reception process that includes frequency conversion (down-conversion), demodulation, and decoding to a control signal acquired from the receive antenna portion 102 and generates control information. The receiver 104 outputs the control information to the beam control portion 106. The receiver 104 calculates reception power of a received signal and outputs the calculated reception power to the beam control portion 106. The control signal may be the beacon signal transmitted by the OBU 20 or the response signal transmitted by the OBU 20, for example.

The upper layer interface portion 105 is an interface that interchanges data with an upper layer. The upper layer interface portion 105 outputs data to be transmitted to the OBU 20 to the transmitter 103, for example. The upper layer interface portion 105 outputs information of the OBU 20 whose entrance into the communication area is detected and data acquired from the OBU 20 to the upper layer, for example.

In the upper layer that is not illustrated, management of the OBU 20 may be performed, and data to be transmitted to the OBU 20 may be generated.

The beam control portion 106 performs control for switching beams of the transmit antenna portion 101 and/or the receive antenna portion 102.

For example, the beam control portion 106 assesses whether or not beamforming training (which will hereinafter be denoted as BFT) is executed based on information acquired from the receiver 104.

For example, the beam control portion 106 acquires information that is included in the beacon signal transmitted by the OBU 20 from the receiver 104. The beam control portion 106 assesses whether or not the OBU 20 as a transmission source of the beacon signal is the OBU 20 that newly enters the communication area of the RSU 10 based on the acquired information. In a case where the OBU 20 as the transmission source of the beacon signal is the OBU 20 that newly enters the communication area, the beam control portion 106 executes the BFT.

Further, for example, in a case where the reception power of the data signal received from the OBU 20 is less than a prescribed value, the beam control portion 106 executes the BFT to switch the beams.

In a case where usable beams are present as a result of execution of the BFT, the beam control portion 106 selects one beam among the usable beams. The beam control portion 106 controls the beam used for data communication such that transmission and reception of the data signal are performed by using the selected beam. Further, the beam control portion 106 records the selected beam in the beam history management portion 107.

In a case where a usable beam is not present as a result of execution of the BFT, the beam control portion 106 assesses that communication with the OBU 20 as a target of the BFT is not continued. Then, the beam control portion 106 performs a procedure for disconnecting the communication with the OBU 20 as the target of the BFT. The beam control portion 106 outputs information about the OBU 20 for which disconnection of communication is performed (for example, the identifier of the OBU 20) to the beam history management portion 107.

The beam history management portion 107 records the history of the beams that are selected in the beam control portion 106. The history of the beams selected in the beam control portion 106 indicates the time change (time transition) in the direction of the beam used for wireless communication with the OBU 20. For example, the beam history management portion 107 stores the identifiers of the OBUs 20 that perform communication by using the selected beams in association with the indices of the selected beams in time series. In a case where the beam history management portion 107 acquires the information about the OBU 20 for which disconnection of communication is performed (for example, the identifier of the OBU 20), the beam history management portion 107 outputs the corresponding history of the beams to the route assessment portion 108.

The route assessment portion 108 assesses the route on which the mobile apparatus which has the OBU 20 travels based on a prescribed assessment reference and the history of the beams recorded in the beam history management portion 107.

Note that examples of the history of the beams and an assessment method based on the history of the beams will be described later.

Note that the above-described transmit antenna portion 101, receive antenna portion 102, transmitter 103, receiver 104, and beam control portion 106 may be referred to as wireless communication portion. The wireless communication portion forms beams in plural different directions in the communication area Ar1 (see FIG. 2) and performs wireless communication with the OBU 20 by using at least any one of beams.

<Configuration of OBU>

Figure 4:
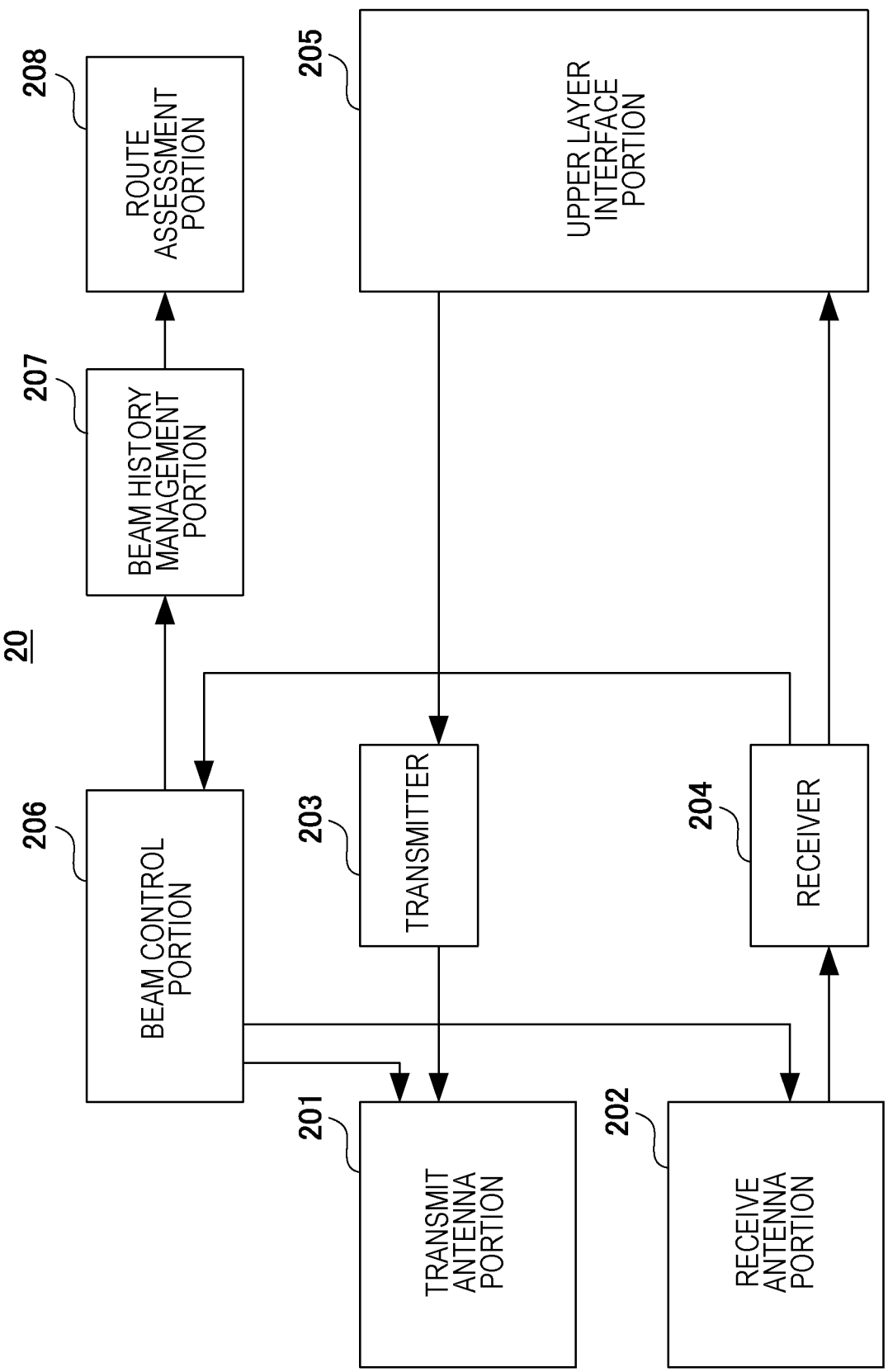
FIG. 4 is a diagram that illustrates one example of a configuration of the OBU according to one embodiment of the present disclosure.

FIG. 4 is a diagram that illustrates one example of a configuration of the OBU 20 according to this embodiment. The OBU 20 includes a transmit antenna portion 201, a receive antenna portion 202, a transmitter 203, a receiver 204, an upper layer interface portion 205, a beam control portion 206, a beam history management portion 207, and a route assessment portion 208.

The transmit antenna portion 201 forms beams in plural directions in accordance with the control by the beam control portion 206 and transmits a data signal that is acquired from the transmitter 203 or a beacon signal that is acquired from the beam control portion 206.

The receive antenna portion 202 forms beams in plural directions in accordance with the control by the beam control portion 206 and receives a signal. The receive antenna portion 202 outputs a received signal to the receiver 204. The received signal includes a data signal transmitted by the RSU 10 or a control signal transmitted by the RSU 10 (for example, a beacon signal or a response signal), for example.

Note that the transmit antenna portion 201 and the receive antenna portion 202 may collectively be denoted as antenna portion.

Note that the transmit antenna portion 201 and the receive antenna portion 202 sweep beams in the horizontal direction with respect to a road surface, for example. For example, a function of forming beams in plural directions (beamforming function) may be realized by a phased array antenna that controls the direction of an electrical wave by controlling the phases of plural transmitted waves (or received waves) or may be realized by a sector antenna that controls the direction of an electrical wave by switching sectors.

Further, the transmit antenna portion 201 and the receive antenna portion 202 may not separately be provided. For example, in a case where time division duplex is used as a wireless communication scheme, one antenna portion may be shared in transmission of a signal and reception of a signal.

The transmitter 203 applies a transmission process that includes coding, modulation, and frequency conversion (up-conversion) to data acquired from the upper layer interface portion 205 and generates a data signal. The transmitter 203 outputs the generated data signal to the transmit antenna portion 201.

The receiver 204 applies a reception process that includes frequency conversion (down-conversion), demodulation, and decoding to a data signal acquired from the receive antenna portion 202 and generates received data. The receiver 204 outputs the received data to the upper layer interface portion 205.

The receiver 204 applies a reception process that includes frequency conversion (down-conversion), demodulation, and decoding to a control signal acquired from the receive antenna portion 202 and generates control information. The receiver 204 outputs the control information to the beam control portion 206. The receiver 204 calculates reception power of a received signal and outputs the calculated reception power to the beam control portion 206. The control signal may be the beacon signal transmitted by the RSU 10 or the response signal transmitted by the RSU 10, for example.

The upper layer interface portion 205 is an interface that interchanges data with the upper layer. The upper layer interface portion 205 outputs data to be transmitted to the RSU 10 to the transmitter 203, for example. The upper layer interface portion 205 outputs information of the RSU 10 whose entrance into the communication area is detected and data acquired from the RSU 10 to the upper layer, for example.

In the upper layer that is not illustrated, management of the RSU 10 may be performed, and data to be transmitted to the RSU 10 may be generated.

The beam control portion 206 performs control for switching beams of the transmit antenna portion 201 and/or the receive antenna portion 202.

For example, the beam control portion 206 assesses whether or not the BFT is executed based on information acquired from the receiver 204.

For example, the beam control portion 206 acquires information that is included in the beacon signal transmitted by the RSU 10 from the receiver 204. The beam control portion 206 assesses whether or not the RSU 10 as a transmission source of the beacon signal is the RSU 10 that newly enters the communication area of the OBU 20 based on the acquired information. In a case where the RSU 10 as the transmission source of the beacon signal is the RSU 10 that newly enters the communication area, the beam control portion 206 executes the BFT.

Further, for example, in a case where the reception power of the data signal received from the RSU 10 is less than a prescribed value, the beam control portion 206 executes the BFT to switch the beams.

In a case where usable beams are present as a result of execution of the BFT, the beam control portion 206 selects one beam among the usable beams. The beam control portion 206 controls the beam used for data communication such that transmission and reception of the data signal are performed by using the selected beam. Further, the beam control portion 206 records the selected beam in the beam history management portion 207.

In a case where a usable beam is not present as a result of execution of the BFT, the beam control portion 206 assesses that communication with the RSU 10 as a target of the BFT is not continued. Then, the beam control portion 206 performs a procedure for disconnecting the communication with the RSU 10 as the target of the BFT. The beam control portion 206 outputs information about the RSU 10 for which disconnection of communication is performed (for example, the identifier of the RSU 10) to the beam history management portion 207.

The beam history management portion 207 records the history of the beams that are selected in the beam control portion 206. The history of the beams selected in the beam control portion 206 indicates the time change in the direction of the beam used for wireless communication with the RSU 10. For example, the beam history management portion 207 stores the identifiers of the RSUs 10 that perform communication by using the selected beams in association with the indices of the selected beams in time series. In a case where the beam history management portion 207 acquires the information about the RSU 10 for which disconnection of communication is performed (for example, the identifier of the RSU 10), the beam history management portion 207 outputs the corresponding history of the beams to the route assessment portion 208.

The route assessment portion 208 assesses the route on which the mobile apparatus which has the OBU 20 travels based on a prescribed assessment reference and the history of the beams recorded in the beam history management portion 207.

Note that in the above-described example, descriptions are made about configurations in which both of the RSU 10 and the OBU 20 have the beam history management portion and the route assessment portion. However, the present disclosure is not limited to this. For example, a wireless communication device that does not select a beam in the BFT or a wireless communication device that performs data communication by using a non-directional beam may not have the beam history management portion or the route assessment portion.

Note that in this embodiment in the following, as one example, a description will be made about an example where the beam control portion 106 of the RSU 10 selects the beam and the beam control portion 206 of the OBU 20 does not select the beam. An example where the beam control portion 206 of the OBU 20 selects the beam will be described in a modification example 4, which will be described later.

<One Example of BFT>

The BFT for selecting the beam used for data communication is executed between the RSU 10 and the OBU 20.

In the following, a description will be made about an example where the RSU 10 is configured to sweep beams in plural directions and the RSU 10 selects the beam. In this case, the OBU 20 may not be configured to sweep beams in plural directions but may be configured to form a non-directional beam, for example.

The BFT includes transmission BFT that transmits the beacon signal by switching the beams of the transmit antenna portion 101 of the RSU 10 and thereby selects the beam and reception BFT that receives the beacon signal by switching the beams of the receive antenna portion 102 and thereby selects the beam. In the BFT, both of the transmission BFT and the reception BFT may be executed, or either one may be executed.

As one example, a description will be made about an example where the transmit antenna portion 101 and the receive antenna portion 102 form the beams in the mutually same direction. In this case, in data communication, the beam selected in the transmission BFT or the reception BFT may be set for both of the transmit antenna portion 101 and the receive antenna portion 102.

In a case where the beam control portion 106 of the RSU 10 executes the transmission BFT, the beam control portion 106 switches the direction of the beam of the transmit antenna portion 101 to plural directions in a time division scheme and transmits plural beacon signals.

The beam control portion 206 of the OBU 20 sets the beam of the receive antenna portion 202 to a non-directional beam and receives plural beacon signals. Then, the beam control portion 206 generates a response signal that includes reception quality (for example, reception power) of each of the beacon signals acquired via the receiver 204 and information of the beam (for example, the index of the beam) used for transmission of each of the beacon signals and transmits the response signal to the RSU 10 via the transmit antenna portion 201. In this case, the transmit antenna portion 201 may form the non-directional beam.

The beam control portion 106 of the RSU 10 acquires information included in the response signal from the receiver 104. Then, the beam control portion 106 assesses whether or not the usable beam is present based on the information included in the response signal.

For example, the beam control portion 106 assesses the beam used for transmission of one or more beacon signals whose reception quality is a prescribed value or more as the usable beam. Then, in a case where two or more usable beams are present, the beam control portion 106 selects one beam among the usable beams. The beam to be selected may be the beam with the highest reception quality (for example, the best beam).

The beam control portion 106 switches the beam of the transmit antenna portion 101 to the selected beam. Further, the beam control portion 106 switches the beam of the receive antenna portion 102 to the selected beam.

In a case where a usable beam is not present, for example, in a case where the reception quality of all the plural beacon signals is less than a prescribed value, the beam control portion 106 assesses that communication with the OBU 20 as the target of the BFT is not continued. Then, the beam control portion 106 performs the procedure for disconnecting the communication.

Note that the above-described example is an example of the transmission BFT. However, the RSU 10 may select the beam by the reception BFT.

In a case where the beam control portion 106 of the RSU 10 executes the reception BFT, the beam control portion 106 transmits a signal for indicating a start of the reception BFT to the OBU 20. In a case where the beam control portion 206 of the OBU 20 acquires the indication of the start of the reception BFT, the beam control portion 206 transmits plural beacon signals via the transmit antenna portion 201. In this case, the transmit antenna portion 201 of the OBU 20 may form the non-directional beam.

The beam control portion 106 of the RSU 10 switches the direction of the beam of the receive antenna portion 102 to plural directions in a time division scheme and receives plural beacon signals. Then, the beam control portion 106 assesses whether or not the usable beam is present based on the reception quality (for example, reception power) of each of the beacon signals acquired via the receiver 104 and the information of the beam (for example, the index of the beam) used for reception of each of the beacon signals.

For example, the beam control portion 106 assesses the beam used for reception of one or more beacon signals whose reception quality is a prescribed value or more as the usable beam. Then, in a case where two or more usable beams are present, the beam control portion 106 selects one beam among the two or more usable beams. The beam to be selected may be the beam with the highest reception quality (for example, the best beam).

The beam control portion 106 switches the beam of the receive antenna portion 102 to the selected beam. Further, the beam control portion 106 switches the beam of the transmit antenna portion 101 to the selected beam.

In a case where a usable beam is not present, for example, in a case where the reception quality of all of one or more beacon signals is less than a prescribed value, the beam control portion 106 assesses that communication with the OBU 20 as the target of the BFT is not continued. Then, the beam control portion 106 performs the procedure for disconnecting the communication.

The RSU 10 selects the beam used for data communication with the OBU 20 by the above-described transmission BFT or reception BFT.

The RSU 10 performs switching to the beam directed to the position of the OBU 20 and thereby performs data communication. In this embodiment, the mobile apparatus that has the OBU 20 moves in a specific range (for example, the routes in FIG. 2). In a case where the mobile apparatus moves in the specific range, the history of the beams directed to the OBU 20 of the mobile apparatus depends on the specific range in which the mobile apparatus moves.

In a case where plural routes are included in the communication area of the RSU 10, the history of the beams that are selected and switched by the RSU 10 is different with respect to each of the plural routes. In this embodiment, an assessment reference is set from the history of the beams that is different with respect to each of the plural routes, and the RSU 10 assesses the route on which the mobile apparatus which has the OBU 20 travels based on a predetermined assessment reference and the history of the beams used for wireless communication with the OBU 20.

In the following, as one example, the positional relationships between the beams formed by the RSU 10 and the mobile apparatus will be described.

Figure 5:
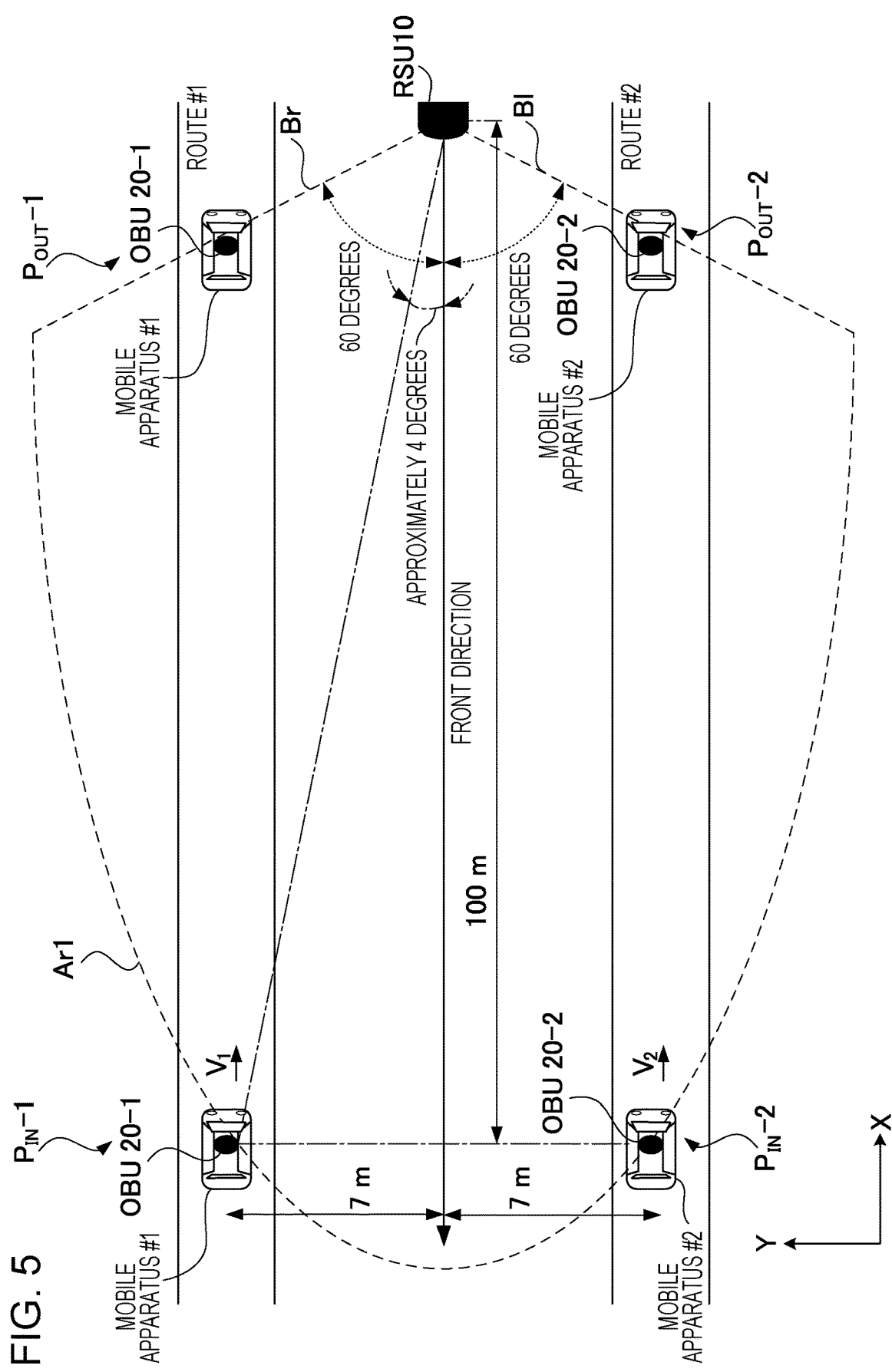
FIG. 5 is a diagram that illustrates one example of positional relationships between beams formed by the RSU and mobile apparatuses.

FIG. 5 is a diagram that illustrates one example of the positional relationships between the beams formed by the RSU 10 and the mobile apparatuses. FIG. 5 illustrates a similar wireless communication system to FIG. 2.

In FIG. 5, the RSU 10 forms the communication area Ar1 that has an angle range of 120 degrees which has the position of the RSU 10 as the center and includes a range of 60 degrees in the left direction and a range of 60 degrees in the right direction with respect to the front direction (the negative direction of the X axis). The mobile apparatus #1 travels on the route #1 at a velocity $V_1$ and enters the communication area Ar1. The mobile apparatus #2 travels on the route #2 at a velocity $V_2$ and enters the communication area Ar1.

In FIG. 5, for example, in the position where the mobile apparatus #1 enters the communication area Ar1 (the position indicated by "$P_{IN}$-1" in FIG. 5), the distance between the OBU 20-1 of the mobile apparatus #1 and the RSU 10 along the axis of the front direction is 100 m, and the distance between the axis of the front direction and the OBU 20-1 is 7 m. In this case, because Arctan(7 [m]/100 [m]) is approximately 4 degrees, the OBU 20-1 is present in the position offset by approximately 4 degrees with respect to the front direction of the RSU 10.

Here, in a case where the RSU 10 forms the beams in 33 directions in the communication area Ar1 with the angle range of 120 degrees, the interval between the neighboring beams of 33 beams is 120 [degrees]/(33−1)=3.75 degrees.

In such a condition, at a stage where the mobile apparatus #1 enters the communication area Ar1, the OBU 20-1 of the mobile apparatus #1 is present substantially in the front direction of the RSU 10. Then, at a stage where the mobile apparatus #1 enters the communication area Ar1, the RSU 10 forms a beam (beam #0) in the front direction or a beam whose angle difference from the front direction is small (for example, a beam #1–R) and performs wireless communication with the OBU 20-1.

In the position where the mobile apparatus #1 travels in the communication area Ar1 but does not yet leave the communication area Ar1 (for example, the position indicated by "$P_{OUT}$-1" in FIG. 5), the OBU 20-1 of the mobile apparatus #1 is positioned in a border Br in the right direction of the communication area Ar1.

In such a condition, at a stage where the mobile apparatus #1 does not yet leave the communication area Ar1, the RSU 10 forms a beam whose angle difference in the right direction is largest with respect to the front direction, for example, and performs wireless communication with the OBU 20-1.

Note that for example, as the mobile apparatus #1 approaches $P_{OUT}$-1 from $P_{IN}$-1 while the mobile apparatus #1 travels in the communication area Ar1, the RSU 10 switches the beams from the beam in the front direction or the beam whose angle difference from the front direction is small to the beam whose angle difference in the right direction is large with respect to the front direction.

Similarly to the above-described mobile apparatus #1, in the position where the mobile apparatus #2 enters the communication area Ar1 (the position indicated by "$P_{IN}$-2" in FIG. 5), the OBU 20-2 of the mobile apparatus #2 is present substantially in the front direction of the RSU 10. Then, at a stage where the mobile apparatus #2 enters the communication area Ar1, the RSU 10 forms the beam (beam

0) in the front direction or a beam whose angle difference from the front direction is small (for example, a beam #1-L) and performs wireless communication with the OBU 20-2.

In the position where the mobile apparatus #2 travels in the communication area Ar1 but does not yet leave the communication area Ar1 (for example, the position indicated by "$P_{OUT}$-2" in FIG. 5), the OBU 20-2 of the mobile apparatus #2 is positioned in a border BI in the left direction of the communication area Ar1.

In such a condition, at a stage where the mobile apparatus #2 does not yet leave the communication area Ar1, the RSU 10 forms a beam whose angle difference in the left direction is largest with respect to the front direction, for example, and performs wireless communication with the OBU 20-2.

Note that for example, as the mobile apparatus #2 approaches $P_{OUT}$-2 from $P_{IN}$-2 while the mobile apparatus #2 travels in the communication area Ar1, the RSU 10 switches the beams from the beam in the front direction or the beam whose angle difference from the front direction is small to the beam whose angle difference in the left direction is large with respect to the front direction.

As described above, the RSU 10 switches the beams formed for performing wireless communication with the OBU 20-1 of the mobile apparatus #1 that travels on the route #1 in accordance with the positional relationship between the route #1 and the communication area covered by the RSU 10. Further, the RSU 10 switches the beams formed for performing wireless communication with the OBU 20-2 of the mobile apparatus #2 that travels on the route #2 in accordance with the positional relationship between the route #2 and the communication area covered by the RSU 10. The RSU 10 assesses the route on which the mobile apparatus which has the OBU 20 travels based on an assessment reference that is set from the history of the beams which is different in accordance with the positional relationship between the route and the communication area formed by the RSU 10 and based on the history of the beams used for wireless communication with the OBU 20.

Next, a description will be made about one example of the assessment reference and one example of assessment based on the assessment reference and the history of the beams.

Figure 6B:
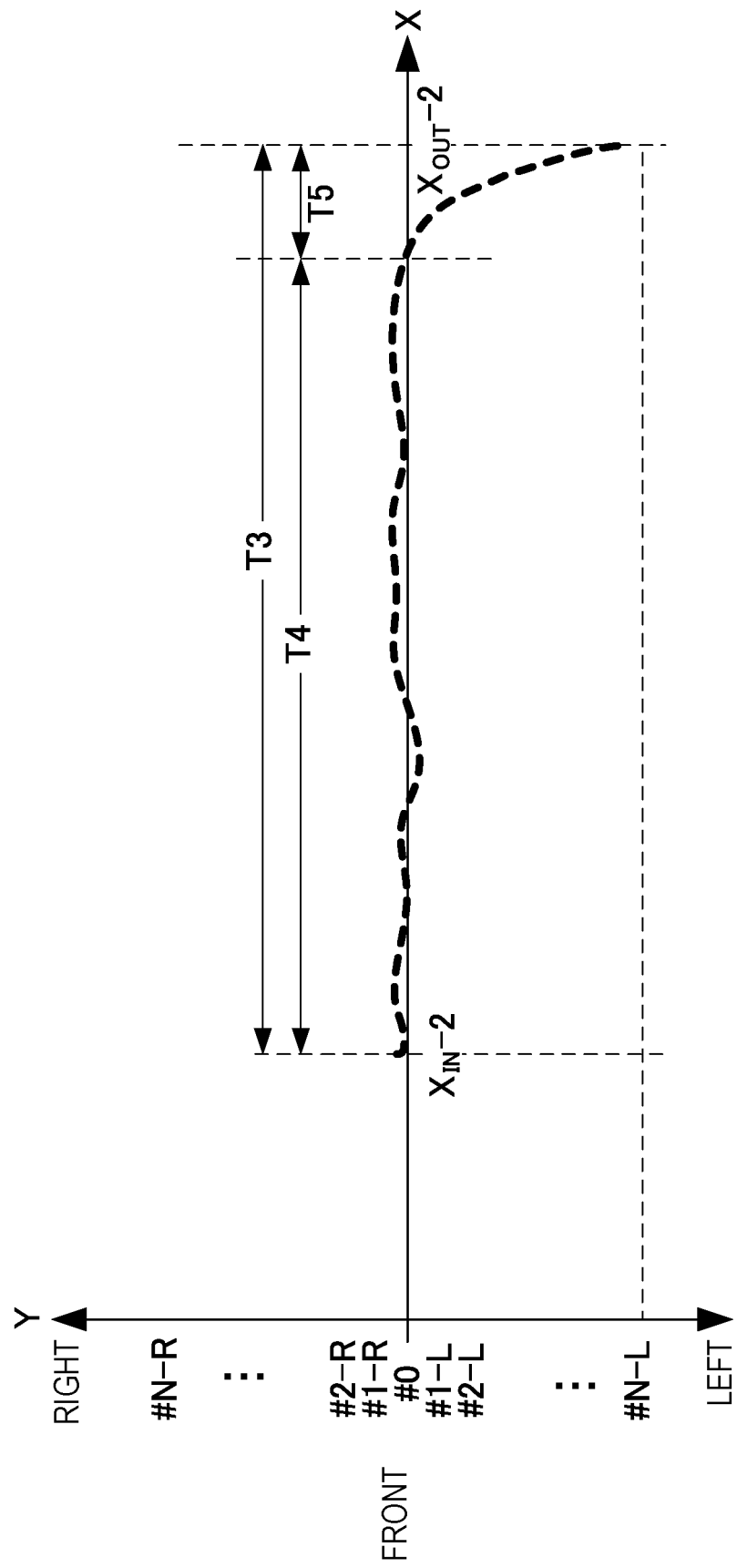
FIG. 6B is a diagram that illustrates one example of a history of beams formed for the OBU of a mobile apparatus #2 which travels on a route #2 in FIG. 5.

FIG. 6A is a diagram that illustrates one example of the history of the beams formed for the OBU 20-1 of the mobile apparatus #1 which travels on the route #1 in FIG. 5 in a case where the mobile apparatus #1 travels in the communication area Ar1 in the route #1 and the mobile apparatus #2 does not travel in the communication area Ar1 in the route #2. FIG. 6B is a diagram that illustrates one example of the history of the beams formed for the OBU 20-2 of the mobile apparatus #2 which travels on the route #2 in FIG. 5 in a case where the mobile apparatus #2 travels in the communication area Ar1 in the route #2 and the mobile apparatus #1 does not travel in the communication area Ar1 in the route #1.

Note that FIG. 6A may be an example where no other mobile apparatus travels in the communication area Ar1 while the mobile apparatus #1 travels in the communication area Ar1 in the route #1. Further, FIG. 6B may be an example where no other mobile apparatus travels in the communication area Ar1 while the mobile apparatus #2 travels in the communication area Ar1 in the route #2.

Note that in a case where the mobile apparatus #1 travels in the communication area Ar1 in the route #1 and the mobile apparatus #2 travels in the communication area Ar1 in the route #2, the RSU 10 executes the BFT for each of the OBUs 20 of the mobile apparatuses in a time division scheme. The OBU 20 has a unique ID (for example, a MAC address), for example, and notifies the RSU 10 of the unique ID in the BFT. The RSU 10 manages and retains results of the BFT with each of the OBUs 20 and the history of the selected beams for each ID. Thus, the RSU 10 may retain a beam history for each of the OBUs 20 and may thus operate the above action for each of the OBUs even in a case where plural mobile apparatuses run side by side or almost simultaneously enter the inside of the area.

In a case where two or more mobile apparatuses travel in the communication area Ar1 in the route #1 and/or the route #2, the RSU 10 executes the BFT for each of the OBUs 20 of the mobile apparatuses in a time division scheme and may thereby manage and retain the results of the BFT with each of the OBUs 20 and the history of the selected beams for each ID.

In FIG. 6A and FIG. 6B, the horizontal axes indicate the position of the OBU 20 that corresponds to the X axis in FIG. 5. For example, on the horizontal axis in FIG. 6A, $X_{IN}$-1 corresponds to the position of $P_{IN}$-1 in FIG. 5 along the X axis, and $X_{OUT}$-1 corresponds to the position of $P_{OUT}$-1 in FIG. 5 along the X axis. Further, on the horizontal axis in FIG. 6B, $X_{IN}$-2 corresponds to the position of $P_{IN}$-2 in FIG. 5 along the X axis, and $X_{OUT}$-2 corresponds to the position of $P_{OUT}$-2 in FIG. 5 along the X axis.

FIG. 6A and FIG. 6B illustrate examples where the horizontal axes are axes that indicate positions. However, the present disclosure is not limited to this. For example, the horizontal axes may be axes that indicate time.

In FIG. 6A and FIG. 6B, the vertical axes indicate the index of the beam formed by the RSU 10, which corresponds to the Y axis in FIG. 5. For example, on the vertical axes, the indices of the beams in the left and right directions are indicated in order from the smallest angle difference from the front direction while index #0 of the beam in the front direction is set as the reference.

Note that FIG. 6A and FIG. 6B are examples where the RSU 10 forms beams in 2N+1 directions.

Further, FIG. 6A indicates the index of the beam selected for the position of the mobile apparatus #1 indicated on the X axis.

For example, for $X_{IN}$-1 that corresponds to the position of $P_{IN}$-1 in FIG. 5 along the X axis, the beam #0 in the front direction is selected. Further, in a section T0 between $X_{IN}$-1 and $X_{OUT}$-1, the RSU 10 appropriately switches the beams, and wireless communication between the RSU 10 and the OBU 20-1 is performed.

In a section T1 in the section T0, because the mobile apparatus #1 is sufficiently distant from the RSU 10 and is present in a position that may be assumed to be in almost the front direction, the beam #0 in the front direction or a beam whose angle difference from the front direction is small (for example, the beam #1-R) is selected.

In a section T2 in the section T0, because the mobile apparatus #1 approaches the RSU 10 and is present in a position where an angle difference is present between the front direction and the right direction, a beam whose angle difference between the front direction and the right direction is large is selected.

For example, for $X_{OUT}$-1 that corresponds to the position of $P_{OUT}$-1 in FIG. 5 along the X axis, the beam whose angle difference in the right direction is largest with respect to the front direction (for example, a beam #N-R) is selected.

FIG. 6B indicates the index of the beam selected for the position of the mobile apparatus #2 indicated on the X axis.

For example, for $X_{IN}$-2 that corresponds to the position of $P_{IN}$-2 in FIG. 5 along the X axis, the beam #0 in the front direction is selected. Further, in a section T3 between $X_{IN}$-2 and $X_{OUT}$-2, the RSU 10 appropriately switches the beams, and wireless communication between the RSU 10 and the OBU 20-2 is performed.

In a section T4 in the section T3, because the mobile apparatus #2 is sufficiently distant from the RSU 10 and is present in a position that may be assumed to be in almost the front direction, the beam #0 in the front direction or a beam whose angle difference from the front direction is small (for example, the beam #1–L) is selected.

In a section T5 in the section T3, because the mobile apparatus #2 approaches the RSU 10 and is present in a position where an angle difference is present between the front direction and the left direction, a beam whose angle difference between the front direction and the left direction is large is selected.

For example, for $X_{OUT}$-2 that corresponds to the position of $P_{OUT}$-2 in FIG. 5 along the X axis, the beam whose angle difference in the left direction is largest with respect to the front direction (for example, a beam #N–L) is selected.

As illustrated in FIG. 6A and FIG. 6B, the history of the beams is different in accordance with the positional relationship between the communication area formed by the RSU 10 and the route. The RSU 10 assesses the route on which the mobile apparatus which has the OBU 20 travels based on the history of the beams.

For example, in a case where the beam used last time in wireless communication with the OBU 20 is the beam in the right direction, the RSU 10 assesses that the mobile apparatus that has the OBU 20 travels on the route #1. Further, in a case where the beam used last time in wireless communication with the OBU 20 is the beam in the left direction, the RSU 10 assesses that the mobile apparatus that has the OBU 20 travels on the route #2. The assessment reference in this case is whether the beam used last time in wireless communication with the OBU 20 is the beam in the right direction or the beam in the left direction.

For example, in a case where the beams in the right direction are more than the beams in the left direction among the beams (for example, among the beams included in the section T2 or the section T5) from the beam used last time in wireless communication with the OBU 20 to the beam used at the ith time (i is an integer which is 1 or more), the RSU 10 assesses that the mobile apparatus that has the OBU 20 travels on the route #1. Further, in a case where the beams in the left direction are more than the beams in the right direction among the beams (for example, among the beams included in the section T2 or the section T5) from the beam used last time in wireless communication with the OBU 20 to the beam used at the ith time (i is an integer which is 1 or more), the RSU 10 assesses that the mobile apparatus that has the OBU 20 travels on the route #2. The assessment reference in this example is which of the beams in the right direction or the beams in the left direction are more among the beams (for example, among the beams included in the section T2 or the section T5) from the beam used last time in wireless communication with the OBU 20 to the beams used at the ith time.

Further, for example, in a case where the beam whose angle difference from the beam in the front direction is a prescribed value or more (assessment beam) is present among the beams used in wireless communication with the OBU 20, the RSU 10 assesses that the mobile apparatus that has the OBU 20 travels on the route #1 in a case where the assessment beam is the beam in the right direction and assesses that the mobile apparatus that has the OBU 20 travels on the route #2 in a case where the assessment beam is the beam in the left direction. The assessment reference in this example is whether the beam whose angle difference from the beam in the front direction is a prescribed value or more among the beams used in wireless communication with the OBU 20 is the beam in the right direction or the beam in the left direction.

In such a manner, the RSU 10 may assess the route on which the mobile apparatus which has the OBU 20 travels based on a preset assessment reference and the history of the beams used in wireless communication with the OBU 20.

<Flowchart of RSU>

Figure 7:
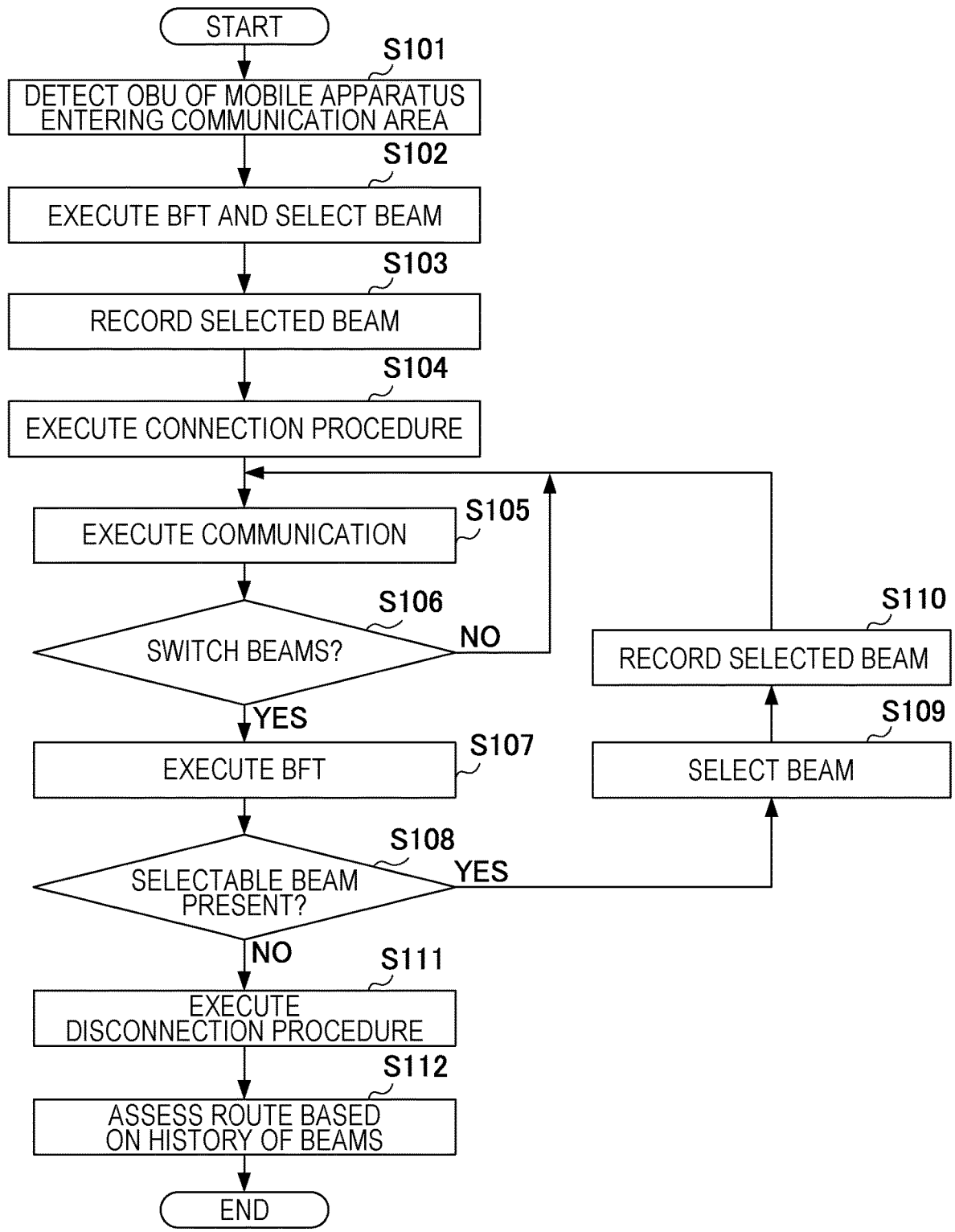
FIG. 7 is a flowchart that illustrates a process by the RSU in one embodiment of the present disclosure.

FIG. 7 is a flowchart that illustrates a process by the RSU 10 in this embodiment. In FIG. 7, an example where the RSU 10 performs a route determination will be described.

The RSU 10 detects the OBU 20 of the mobile apparatus that enters a communication area Ar (S101). For example, the RSU 10 detects the OBU 20 by receiving a beacon that is regularly transmitted by the OBU 20.

The RSU 10 executes the BFT with the OBU 20 and selects the beam used for communication with the OBU 20 (S102).

The RSU 10 records the selected beam (S103).

The RSU 10 executes a connection procedure with the OBU 20 by using the selected beam (S104).

The RSU 10 executes communication by using the selected beam and performs transmission and reception of data (S105).

After execution of communication, the RSU 10 assesses whether or not the beams used for communication with the OBU 20 are switched (S106). For example, in a case where after execution of the communication, the power of the received signal that is received from the OBU 20 becomes less than a prescribed value at the time when the BFT is executed in S102, the RSU 10 assesses that the beams are switched. In a case where the power of the received signal is the prescribed value or more, the RSU 10 assesses that the beams are not switched.

In a case where the beams are not switched (NO in S106), the flow returns to S105.

In a case where the beams are switched (YES in S106), the RSU 10 executes the BFT with the OBU 20 (S107).

As a result of execution of the BFT, the RSU 10 assesses whether or not a selectable beam is present (S108). For example, in a case where at least any one of the beams formed in the BFT is a usable beam for communication, the RSU 10 assesses that a selectable beam is present.

In a case where a selectable beam is present (YES in S108), the RSU 10 selects the beam (S109).

Then, the RSU 10 records the selected beam (S110). Then, the flow returns to S105.

In a case where a selectable beam is not present (NO in S108), for example, in a case where continuation of communication is difficult even if any beam that may be formed by the RSU 10 is used, the RSU 10 executes a procedure for disconnecting communication with the OBU 20 (S111).

The RSU 10 assesses the route on which the mobile apparatus which has the OBU 20 travels based on the history of the beams used for wireless communication with the OBU 20 (S112). Then, the flow finishes.

As described above, the RSU 10 according to this embodiment is a wireless communication device for a road side zone, for example, and includes the wireless communication portion that forms the beams in plural different directions in a time division scheme in the communication area which includes plural routes and the beam history management portion 107 that records the time change in the direction of the beam used by the wireless communication portion for wireless communication with the OBU 20 of the mobile apparatus which moves on any of plural routes.

In this configuration, the route may be assessed even in a case where the communication area is expanded in order to perform large capacity communication. As a result, the RSU 10 and the OBU 20 may realize data communication corresponding to the route of the mobile apparatus that has the OBU 20.

Modification Example 1

Note that in the above-described example, the RSU 10 forms the communication area Ar that is axially symmetrical with respect to the front direction and assesses the route in which the mobile apparatus is present in the route #1 and the route #2 that run side by side. However, the present disclosure is not limited to this. In the following, a description will be made about a modification example 1 where in the route #1 and the route #2 that run side by side, the RSU 10 forms a communication area that is asymmetrical with respect to the front direction and assesses the route in which the mobile apparatus is present.

Figure 8:
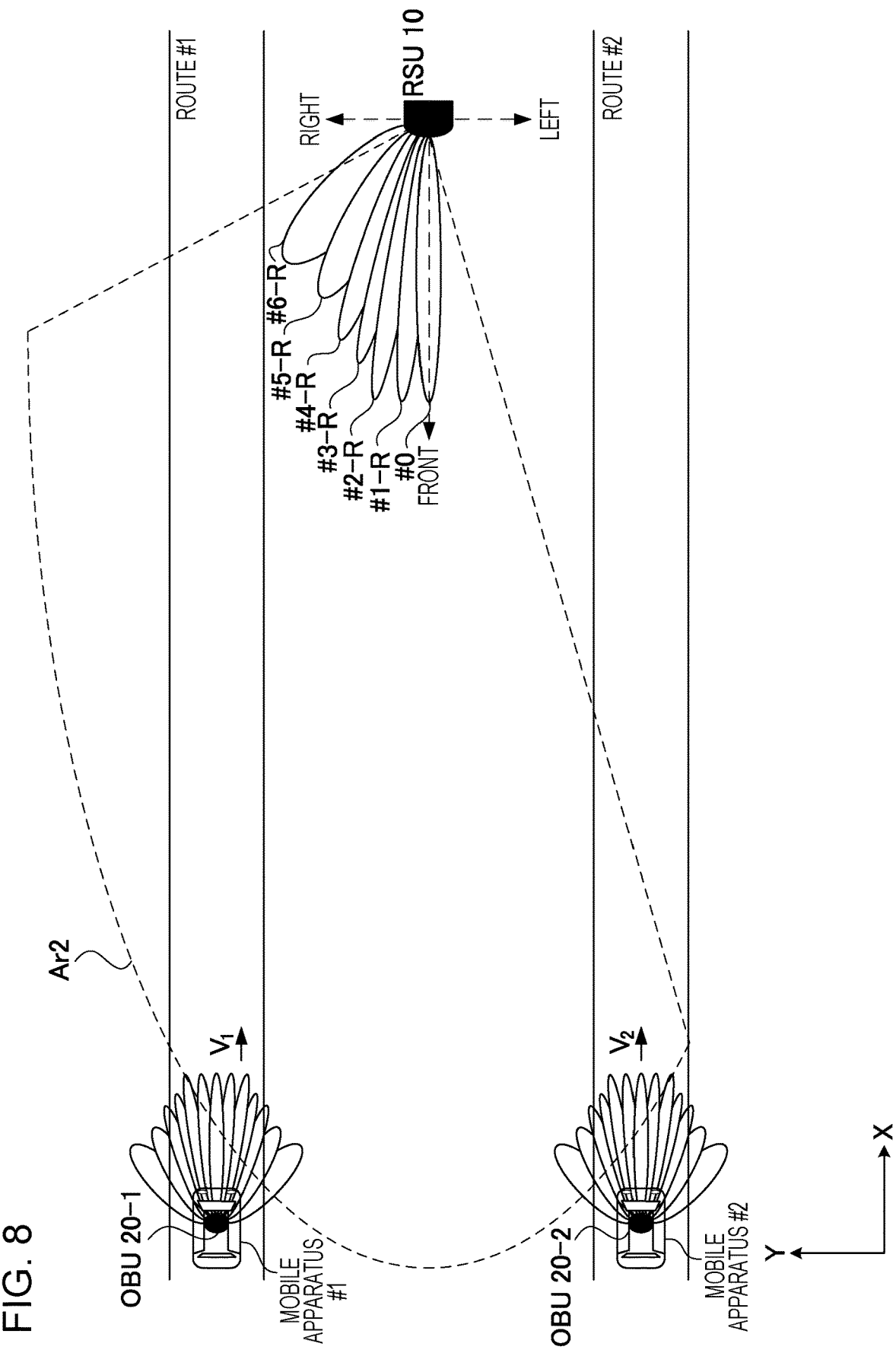
FIG. 8 is a diagram that illustrates an example of a wireless communication system according to a modification example 1 of one embodiment of the present disclosure.

FIG. 8 is a diagram that illustrates an example of a wireless communication system according to the modification example 1 of this embodiment. Note that in FIG. 8, the same reference characters are provided to similar configurations to FIG. 2, and descriptions thereof will not be made.

The positions of the route #1 and the route #2 and the position of the RSU 10 in FIG. 8 are similar to FIG. 2. A difference between FIG. 2 and FIG. 8 is a point that the RSU 10 in FIG. 8 forms the beam #0 in the front direction and the beam #1-R to a beam #6-R in the right direction and thereby forms a communication area Ar2 that is asymmetrical with respect to the front direction.

In a case of FIG. 8, the positional relationship between the communication area Ar2 formed by the RSU 10 and the route #1 is similar to the positional relationship between the communication area Ar1 and the route #1, which is illustrated in FIG. 2. Thus, the history of the beams used for wireless communication with the OBU 20-1 of the mobile apparatus #1 that travels on the route #1 in FIG. 8 is similar to FIG. 6A. On the other hand, in the case of FIG. 8, the positional relationship between the communication area Ar2 formed by the RSU 10 and the route #2 is different from the positional relationship between the communication area Ar1 and the route #2, which is illustrated in FIG. 2.

Figure 9:
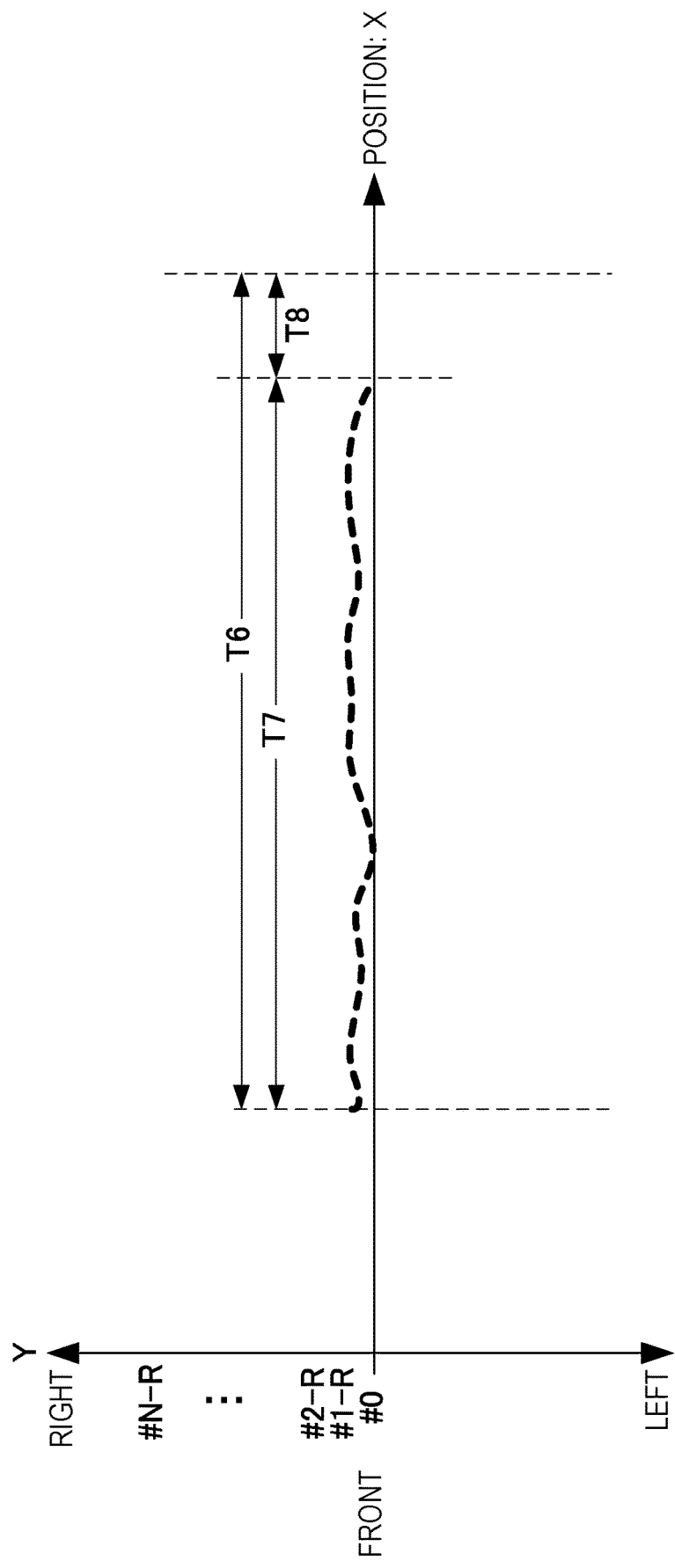
FIG. 9 is a diagram that illustrates one example of a history of beams formed for the OBU of the mobile apparatus #2 which travels on the route #2 in FIG. 8.

FIG. 9 is a diagram that illustrates one example of the history of the beams formed for the OBU 20-2 of the mobile apparatus #2 that travels on the route #2 in FIG. 8.

In FIG. 9, the horizontal axis indicates the position of the OBU 20 that corresponds to the X axis in FIG. 8.

Note that FIG. 9 illustrates an example where the horizontal axis is an axis that indicates a position. However, the present disclosure is not limited to this. For example, the horizontal axis may be an axis that indicates time.

In FIG. 9, the vertical axis corresponds to the Y axis in FIG. 8 and indicates the index of the beam formed by the RSU 10. In the example in FIG. 8, the RSU 10 forms the beams in the right directions but does not form the beams in the left direction. Thus, on the vertical axis in FIG. 9, the indices of the beams in the right direction are indicated in order from the smallest angle difference from the front direction while index #0 of the beam in the front direction is set as the reference.

Further, FIG. 9 indicates the index of the beam selected for the position of the mobile apparatus #2 indicated on the X axis.

A section T6 to a section T8 respectively correspond to the section T3 to the section T5 indicated in FIG. 6B. However, because the length of the section T8 and the end spot of the section T6 are not actually measured, those are indicated as guides.

In the section T7 in the section T6, similarly to the section T4 indicated in FIG. 6B, because the mobile apparatus #2 is sufficiently distant from the RSU 10 and is present in a position that may be assumed to be in almost the front direction, the beam #0 in the front direction or a beam whose angle difference from the front direction is small is selected. Note that because the RSU 10 does not form the beam in the left direction in FIG. 8, the beam whose angle difference from the front direction is small is the beam #1-R, for example.

In the section T8, it is predicted that the mobile apparatus #2 approaches the RSU 10 and is present in a position where an angle difference is present between the front direction and the left direction. In FIG. 8, because the RSU 10 does not form the beam in the left direction, in a case where the mobile apparatus #2 is present in a position where an angle difference is present between the front direction and the left direction, the beam in the direction that corresponds to the position of the mobile apparatus #2 is not selected. Thus, the section T8 is a section where the history of the beams is not present.

In the example in FIG. 8 also, the RSU 10 may assess the route on which the mobile apparatus which has the OBU 20 travels based on the history of the beams.

For example, in a case where the index of the beam used last time in wireless communication with the OBU 20 is the index of the beam in the right direction, whose angle difference from the beam in the front direction is a prescribed value or more, the RSU 10 assesses that the mobile apparatus that has the OBU 20 travels on the route #1. Further, in a case where the index of the beam used last time in wireless communication with the OBU 20 is the beam #0 in the front direction or the beam in the right direction, whose angle difference from the beam #0 in the front direction is less than the prescribed value (for example, the beam #1-R), the RSU 10 assesses that the mobile apparatus that has the OBU 20 travels on the route #2. The assessment reference in this example is whether or not the angle difference between the beam used last time in wireless communication with the OBU 20 and the beam #0 in the front direction is the prescribed value or more.

Further, for example, in a case where the number of kinds of indices of the beams used in wireless communication with the OBU 20 is a prescribed number or more, the RSU 10 assesses that the mobile apparatus that has the OBU 20 travels on the route #1. Further, in a case where the number of kinds of indices of the beams used in wireless communication with the OBU 20 is less than the prescribed number, the RSU 10 assesses that the mobile apparatus #2 that has the OBU 20 travels on the route #2. The assessment reference in this example is whether or not the number of kinds of indices of the beams used in wireless communication with the OBU 20 is the prescribed number or more.

Note that in FIG. 8, the number of beam indices is indicated as half that of FIG. 2. However, without decreasing the number of beam indices, the same number of beam indices may be configured by using beams with thinner widths than those in FIG. 2.

Consequently, in the modification example 1, the arrangement of the beams is narrowed to the route #1, the widths of the beams may thereby be thinned, and detection precision of the mobile apparatus on the route #1 may be improved.

Modification Example 2

Note that in the above-described example, an example is described where the front direction of the RSU 10 is the direction along the routes. The present disclosure is not limited to this. In the following, a description will be made about a modification example 2 where in the route #1 and the route #2 that run side by side, the front direction of the RSU 10 is a different direction from the direction along the route #1 and the route #2 and a determination is made that the mobile apparatus is present in the route #1.

Figure 10:
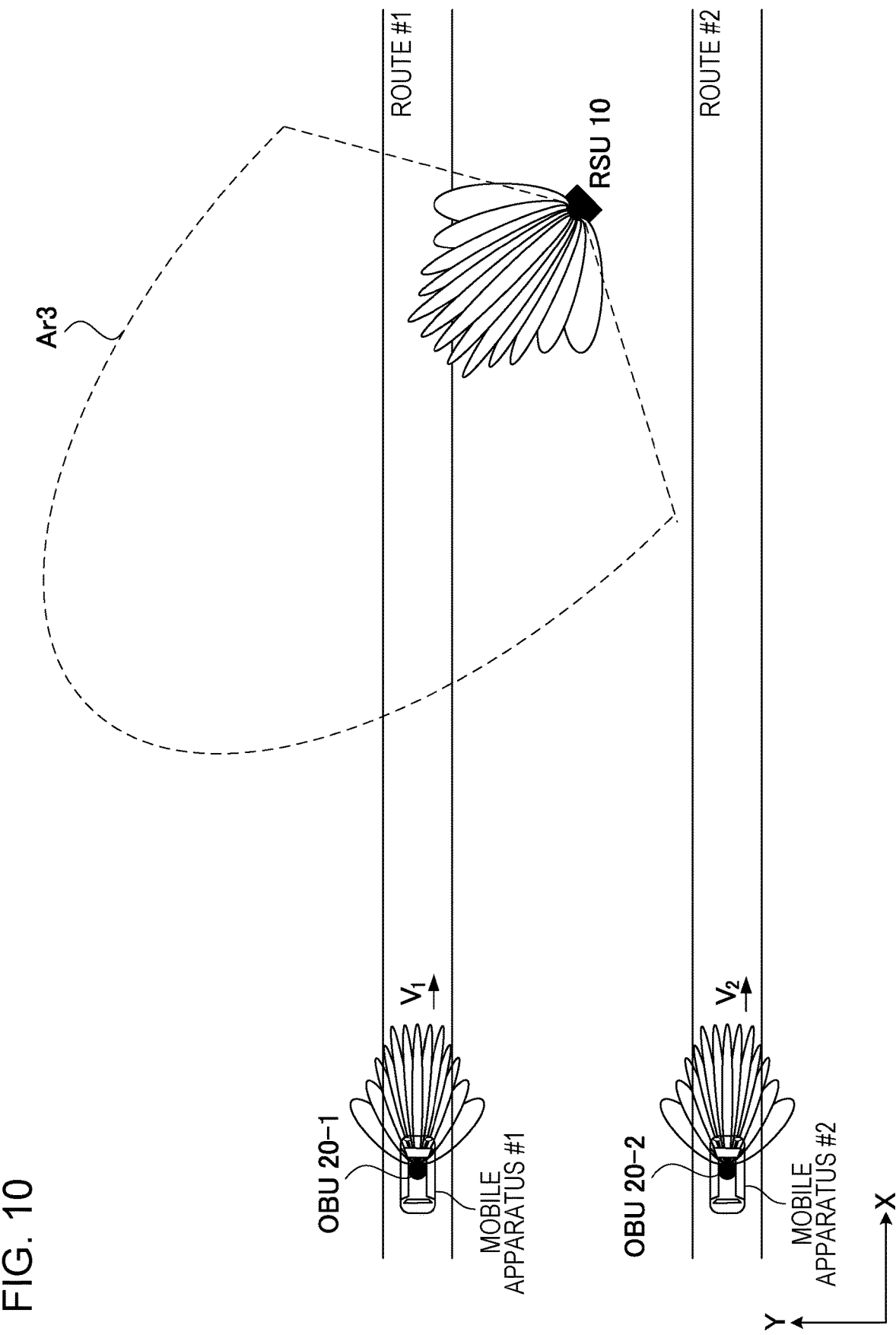
FIG. 10 is a diagram that illustrates an example of a wireless communication system according to a modification example 2 of one embodiment of the present disclosure.

FIG. 10 is a diagram that illustrates an example of a wireless communication system according to the modification example 2 of this embodiment. Note that in FIG. 10, the same reference characters are provided to similar configurations to FIG. 2, and descriptions thereof will not be made.

A difference between FIG. 2 and FIG. 10 is a point that the direction of the RSU 10 in FIG. 10 is different. In FIG. 10, the beam #0 in the front direction is formed in a direction inclined to the route #1 side, and a communication area Ar3 is formed.

Next, a description will be made about examples of the history of the beams that is different in accordance with the positional relationship between the communication area Ar3 illustrated in FIG. 10 and formed by the RSU 10 and the route and of assessment based on the history of the beams.

Figure 11:
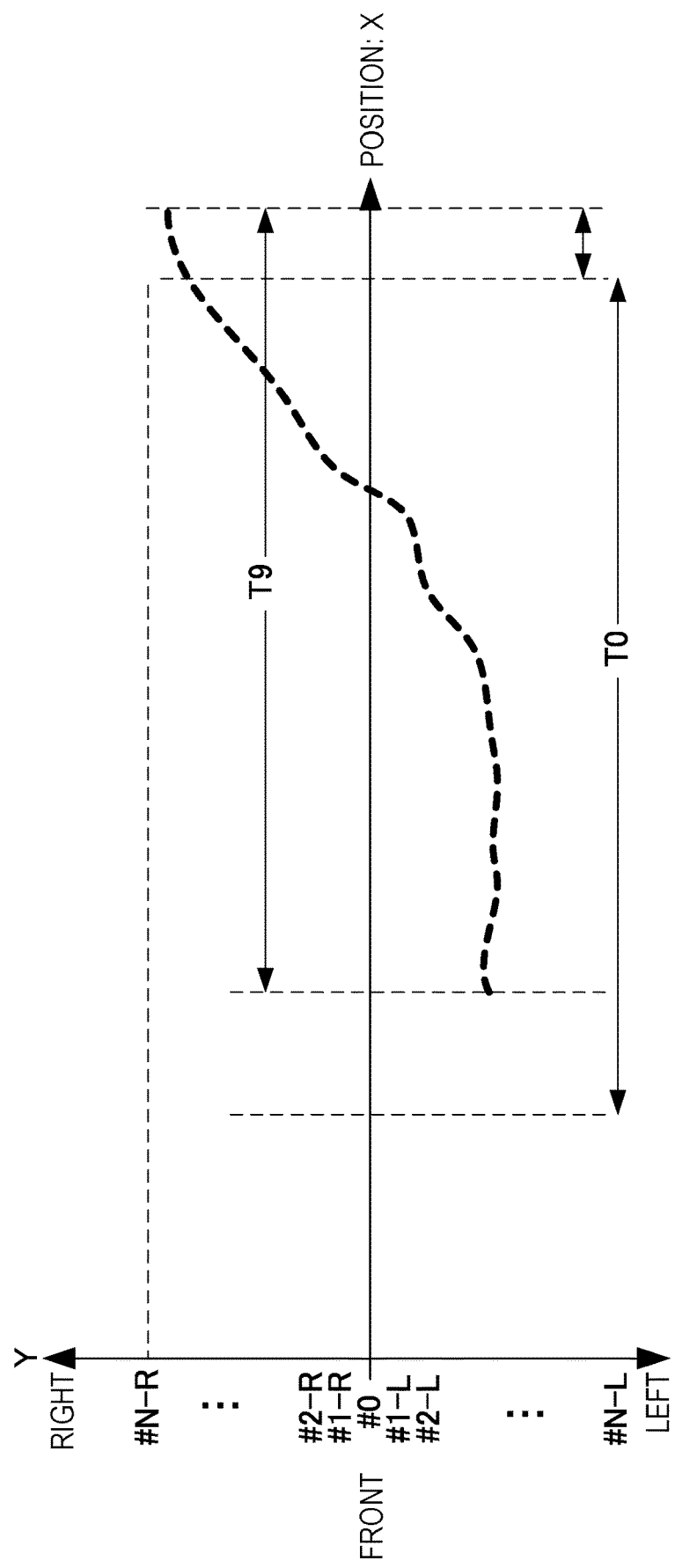
FIG. 11 is a diagram that illustrates one example of a history of beams formed for the OBU of the mobile apparatus #1 which travels on the route #1 in FIG. 10.

FIG. 11 is a diagram that illustrates one example of the history of the beams formed for the OBU 20-1 of the mobile apparatus #1 that travels on the route #1 in FIG. 10.

In FIG. 11, the horizontal axis indicates the position of the OBU 20 that corresponds to the X axis in FIG. 10.

In FIG. 11, the vertical axis corresponds to the Y axis in FIG. 10 and indicates the index of the beam formed by the RSU 10. For example, on the vertical axis, the indices of the beams in the left and right directions are indicated in order from the smallest angle difference from the front direction while index #0 of the beam in the front direction is set as the reference.

Further, FIG. 11 indicates the index of the beam selected for the position of the mobile apparatus #1 indicated on the X axis. Note that FIG. 11 indicates the section T0 indicated in FIG. 6A for comparison.

In a section T9, the RSU 10 selects the beam in the left direction and starts wireless communication. Then, the direction of the beam is changed from the left direction to the right direction in response to the travel of the mobile apparatus #1.

The section T9 is a section in which wireless communication between the RSU 10 and the OBU 20-1 is performed. When the section T9 is compared with the section T0, the section in which wireless communication is performed is shorter in the section T9 than the section T0.

Similarly to the above-described example, the RSU 10 assesses whether or not the mobile apparatus that has the OBU 20 travels on the route #1 as a determination target based on the history of the beams illustrated in FIG. 11.

For example, in a case where one or more beams which are used in wireless communication with the OBU 20 are present, the RSU 10 assesses that the mobile apparatus that has the OBU 20 travels on the route #1. Further, in a case where a beam selected in wireless communication with the OBU 20 is not present, the RSU 10 assesses that the mobile apparatus does not present on the route #1. The assessment reference in this example is whether or not the beam is used in wireless communication with the OBU 20.

Note that in FIG. 10, the RSU 10 is arranged for the route #1 but is not arranged for the route #2. However, the RSU 10 may be arranged for the route #2. That is, a configuration is possible in which the RSU 10 is arranged for each of the routes.

Consequently, although a cost increases because the RSU 10 is installed for each of the routes, shortening of the process for a route determination (for example, deletion of S112 in FIG. 7) may be intended.

Modification Example 3

Note that in the above-described example, an example is described where the RSU 10 is provided between two routes that run side by side. The present disclosure is not limited to this. In the following, a description will be made about a modification example 3 where the RSU 10 has plural antenna portions and the antenna portions are provided between respective neighboring routes of three or more routes that run side by side.

Figure 12:
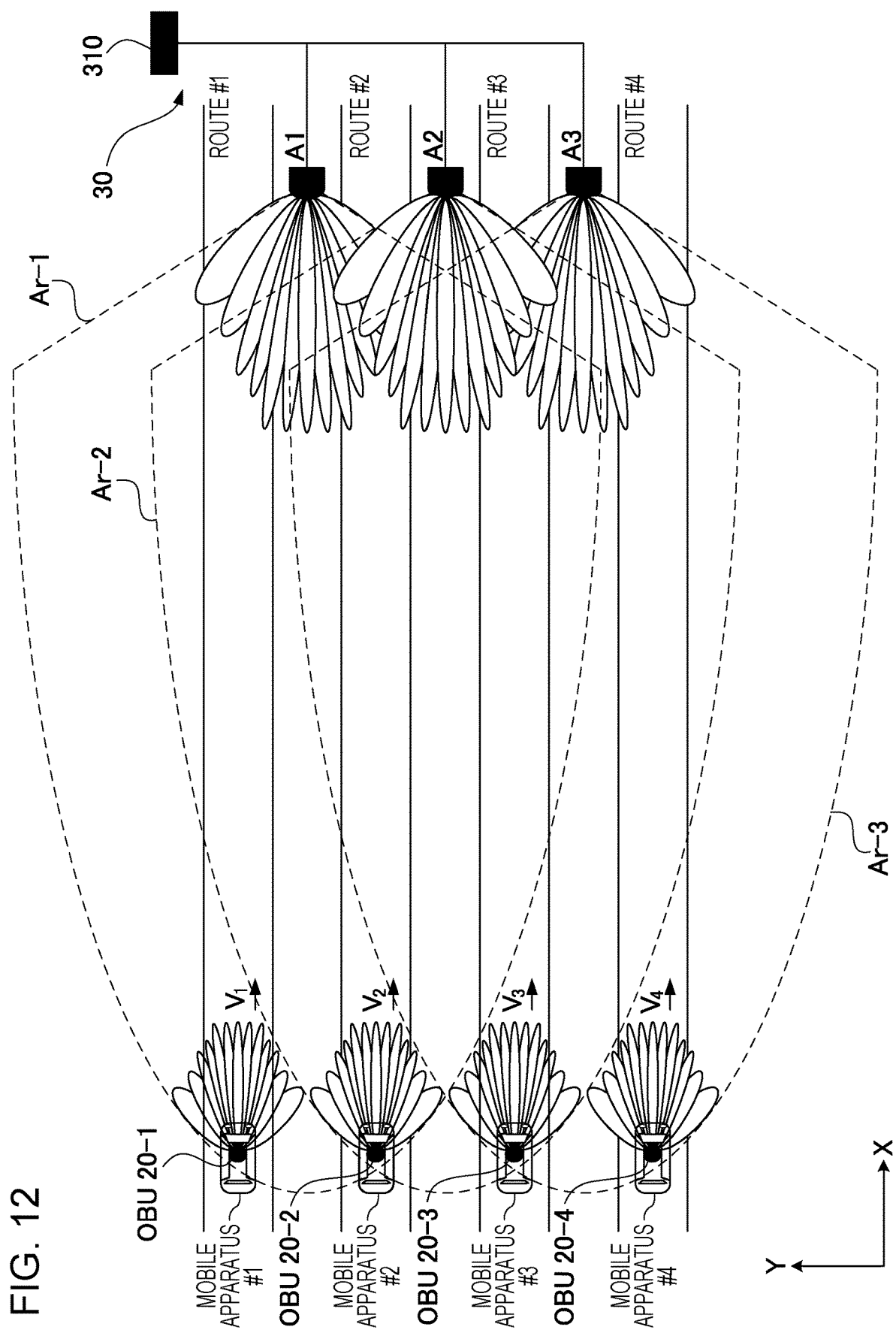
FIG. 12 is a diagram that illustrates an example of a wireless communication system according to a modification example 3 of one embodiment of the present disclosure.

FIG. 12 is a diagram that illustrates an example of a wireless communication system according to the modification example 3 of this embodiment. Note that in FIG. 12, the same reference characters are provided to similar configurations to FIG. 2, and descriptions thereof will not be made.

Differently from FIG. 2, in FIG. 12, a route #3 and a route #4 are added, and antenna portions of an RSU 30 are added between the route #2 and the route #3 and between the route #3 and the route #4.

FIG. 12 illustrates the mobile apparatus #1 that has the OBU 20-1 and travels on the route #1 at the velocity $V_1$, the mobile apparatus #2 that has the OBU 20-2 and travels on the route #2 at the velocity $V_2$, a mobile apparatus #3 that has an OBU 20-3 and travels on the route #3 at a velocity $V_3$, and a mobile apparatus #4 that has an OBU 20-4 and travels on the route #4 at a velocity $V_4$.

The route #1 to the route #4 are roads that linearly extend along the X axis and are parallel with each other, for example.

The RSU 30 has an antenna portion A1 to an antenna portion A3 and one wireless control portion 310. The antenna portion A1 is installed between the route #1 and the route #2, the antenna portion A2 is installed between the route #2 and the route #3, and the antenna portion A3 is installed between the route #3 and the route #4.

The antenna portion A1 forms a communication area Ar-1 by performing the beam sweeping in the horizontal direction with respect to the road surfaces (for example, the direction along the road surfaces, or the Y-axis direction). The antenna portion A2 forms a communication area Ar-2 by performing the beam sweeping in the horizontal direction with respect to the road surfaces (for example, the direction along the road surfaces, or the Y-axis direction). The antenna portion A3 forms a communication area Ar-3 by performing the beam sweeping in the horizontal direction with respect to the road surfaces (for example, the direction along the road surfaces, or the Y-axis direction).

Note that in the following, a description will be made on an assumption that the directions and number of the beams formed by each of the antenna portion A1 to the antenna portion A3 are similar to the directions and number of the beams formed by the RSU 10 illustrated in FIG. 2. Further, a description will be made on an assumption that similar identifiers (for example, indices) to the beams formed by the RSU 10 illustrated in FIG. 2 are provided to the beams formed by each of the antenna portion A1 to the antenna portion A3.

Figure 13:
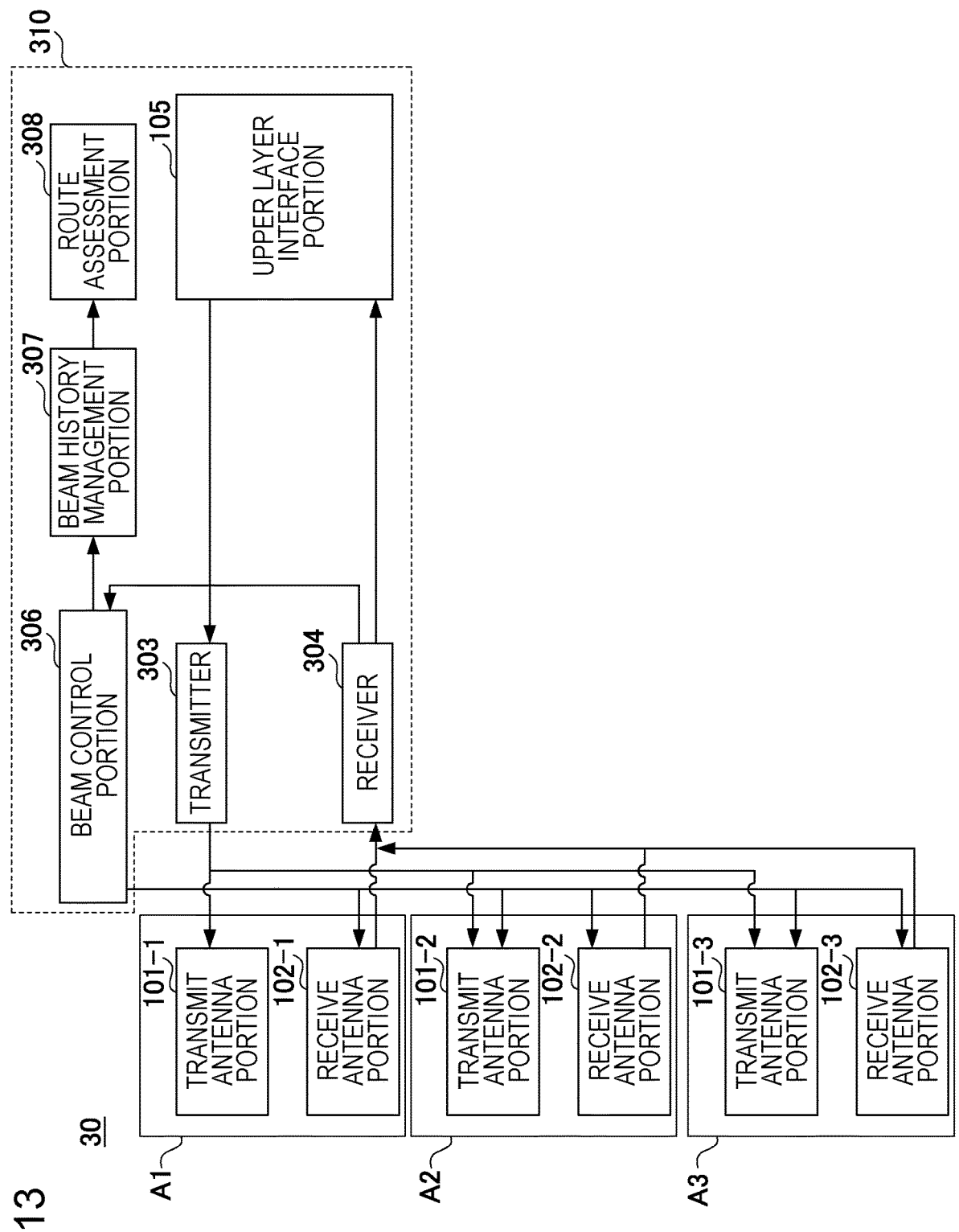
FIG. 13 is a diagram that illustrates one example of a configuration of the RSU according to the modification example 3 of one embodiment of the present disclosure.

FIG. 13 is a diagram that illustrates one example of a configuration of the RSU 30 according to the modification example 3 of this embodiment. Note that in FIG. 13, the same reference characters are provided to similar configurations to FIG. 3, and descriptions thereof will not be made.

The RSU 30 has the antenna portion A1 to the antenna portion A3 and the wireless control portion 310. The wireless control portion 310 includes a transmitter 303, a receiver 304, the upper layer interface portion 105, a beam control portion 306, a beam history management portion 307, and a route assessment portion 308.

Each of the antenna portion A1 to the antenna portion A3 has the transmit antenna portion 101 and the receive antenna portion 102. Data communication with the OBU 20 is executed via at least any one of the antenna portion A1 to the antenna portion A3.

The transmitter 303 applies a transmission process that includes coding, modulation, and frequency conversion (up-conversion) to data acquired from the upper layer interface portion 105 and generates a data signal. The transmitter 303 outputs the generated data signal to the transmit antenna portion 101 of the antenna portion that performs data communication with the OBU 20.

The receiver 304 applies a reception process that includes frequency conversion (down-conversion), demodulation, and decoding to a data signal acquired from the receive antenna portion 102 of the antenna portion that performs data communication with the OBU 20 and generates received data. The receiver 304 outputs the received data to the upper layer interface portion 105.

The receiver 304 applies a reception process that includes frequency conversion (down-conversion), demodulation, and decoding to a control signal acquired from the receive antenna portion 102 and generates control information. The receiver 304 outputs the control information to the beam control portion 306. The receiver 304 calculates reception power of a received signal and outputs the calculated reception power to the beam control portion 306. The control signal may be plural beacon signals transmitted by the OBU 20 or the response signal transmitted by the OBU 20, for example.

The beam control portion 306 sets the antenna portion that performs data communication with the OBU 20 and performs control for switching the beams of the transmit antenna portion 101 and/or the receive antenna portion 102 of the set antenna portion.

For example, the beam control portion 306 assesses whether or not the BFT is executed based on information acquired from the receiver 304.

For example, the beam control portion 306 acquires information that is included in the plural beacon signals transmitted by the OBU 20 from the receiver 304. The beam control portion 306 sets the antenna portion that includes the receive antenna portion 102 which receives plural beacon signals as the antenna portion that performs data communication with the OBU 20.

The beam control portion 306 assesses whether or not the OBU 20 as a transmission source of the plural beacon signals is the OBU 20 that newly enters the communication area based on the acquired information. In a case where the OBU 20 as the transmission source of the plural beacon signals is the OBU 20 that newly enters the communication area, the beam control portion 306 executes the BFT.

Further, for example, in a case where the reception power of the data signal transmitted by the OBU 20 is less than a prescribed value, the beam control portion 306 executes the BFT to switch the beams.

Note that the beam control portion 306 may execute the BFT for selecting the beam in each of the antenna portions or may execute the BFT for selecting the beam in the antenna portion that performs data communication with the OBU 20.

For example, in a case where the BFT for selecting the beam is executed in each of the antenna portions, the beam control portion 306 executes the reception BFT. The reception BFT may reduce the frequency of transmission and reception of the beacon signals compared to the transmission BFT because the plural beacon signals transmitted by the OBU 20 are received by each of the antenna portions by switching the beams in plural directions.

In a case where usable beams are present as a result of execution of the BFT, the beam control portion 306 selects one beam among the usable beams. The beam control portion 306 controls the beam used for the data communication such that transmission and reception of the data signal are performed by using the selected beam. Further, the beam control portion 306 records the selected beam in the beam history management portion 307.

For example, in a case where the BFT for selecting the beam is executed in each of the antenna portions, the beam control portion 306 may select one beam among the usable beams in each of the antenna portions. For example, in a case where the beam control portion 306 selects the beam of the different antenna portion from the antenna portion that is used before execution of the BFT, the beam control portion 306 may switch the antenna portions that perform data communication.

Alternatively, in a case where the BFT for selecting the beam is executed in each of the antenna portions, the beam control portion 306 may select one beam for each of the antenna portions among the usable beams of the antenna portions. In this case, the beam history management portion 307 records the beam that is selected for each of the antenna portions.

In a case where a usable beam is not present as a result of execution of the BFT, the beam control portion 306 assesses that communication with the OBU 20 as the target of the BFT is not continued. Then, the beam control portion 306 performs a procedure for disconnecting the communication with the OBU 20 as the target of the BFT. The beam control portion 306 outputs information about the OBU 20 for which disconnection of communication is performed (for example, the identifier of the OBU 20) to the beam history management portion 307.

The beam history management portion 307 records the history of the beams that are selected in the beam control portion 306. For example, the beam history management portion 307 stores the identifiers of the OBUs 20 that perform communication by using the selected beams in association with the indices of the selected beams and with the antenna portions that form the beams in time series. Further, in a case where the beam history management portion 307 acquires the information about the OBU 20 for which disconnection of communication is performed (for example, the identifier of the OBU 20), the beam history management portion 307 outputs the corresponding history of the beams to the route assessment portion 308.

The route assessment portion 308 assesses the route on which the mobile apparatus which has the OBU 20 travels based on the history of the beams of the OBU 20 whose communication is disconnected.

Figure 14:
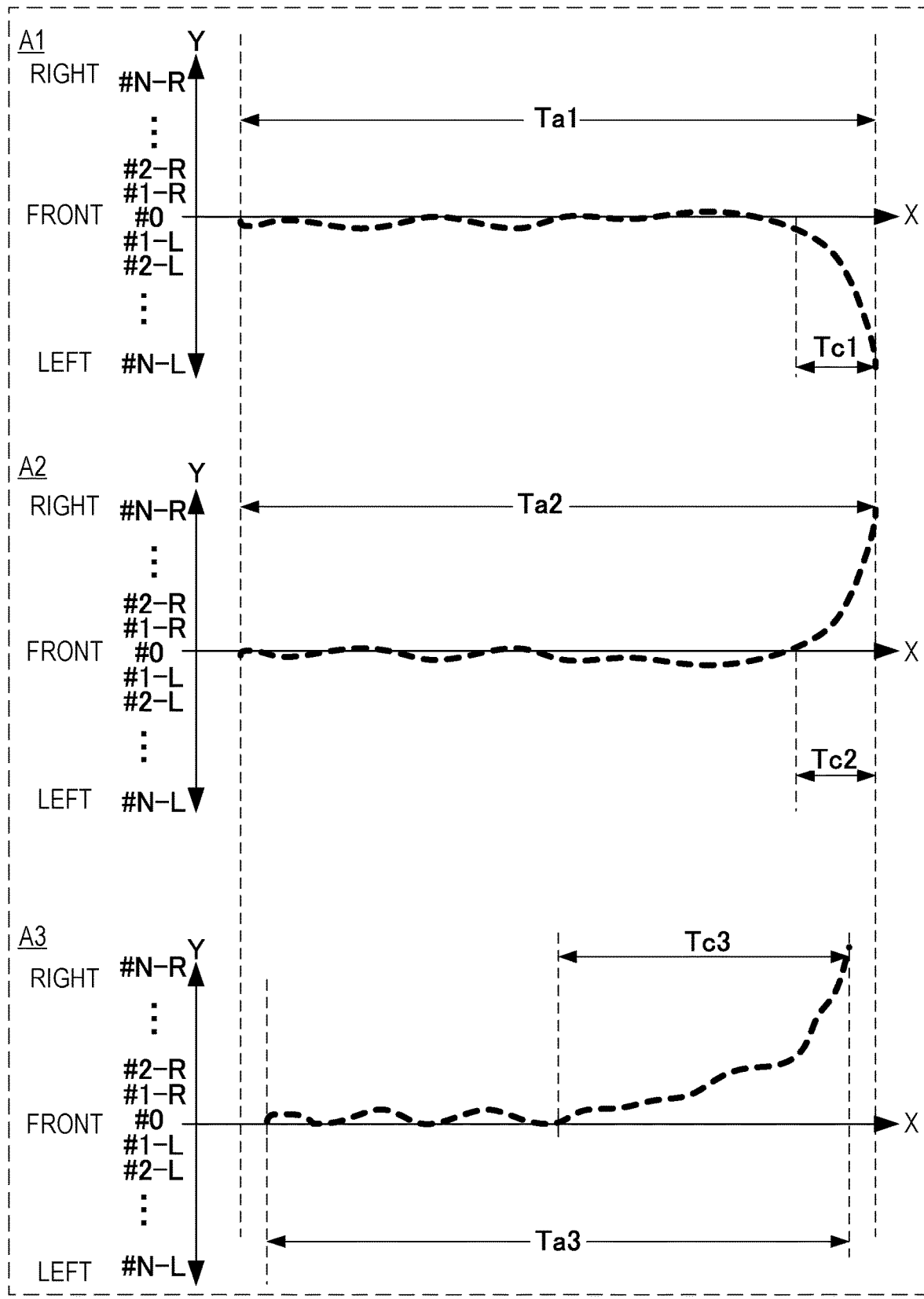
FIG. 14 is a diagram that illustrates one example of a history of beams formed for the OBU of the mobile apparatus #2 which travels on the route #2 in FIG. 12.

FIG. 14 is a diagram that illustrates one example of the history of the beams formed for the OBU 20-2 of the mobile apparatus #2 that travels on the route #2 in FIG. 12. Note that FIG. 14 illustrates an example where the mobile apparatus #2 travels in the communication areas Ar-1 to Ar-3 in the route #2 but the other mobile apparatuses than the mobile apparatus #2 do not travel in the communication areas Ar-1 to Ar-3.

FIG. 14 illustrates the histories of the beams that are respectively formed for the OBU 20-2 by the antenna portion A1 to the antenna portion A3.

In FIG. 14, the horizontal axis indicates the position of the OBU 20 that corresponds to the X axis in FIG. 14.

Note that FIG. 14 illustrates an example where the horizontal axis is an axis that indicates a position. However, the present disclosure is not limited to this. For example, the horizontal axis may be an axis that indicates time.

In FIG. 14, the vertical axis corresponds to the Y axis in FIG. 12 and indicates the indices of the beams formed by the antenna portion A1 to the antenna portion A3. As described above, similar identifiers (for example, indices) to the beams formed by the RSU 10 illustrated in FIG. 2 are provided to the beams formed by each of the antenna portion A1 to the antenna portion A3.

Further, FIG. 14 indicates the index of the beam selected for the position of the mobile apparatus #2 indicated on the X axis. Note that a section Ta1 is a section where communication with the OBU 20-2 of the mobile apparatus #2 that travels on the route #2 is possible by using the antenna portion A1. A section Ta2 is a section where communication with the OBU 20-2 of the mobile apparatus #2 that travels on the route #2 is possible by using the antenna portion A2. A section Ta3 is a section where communication with the OBU 20-2 of the mobile apparatus #2 that travels on the route #2 is possible by using the antenna portion A3.

The antenna portion A1 is installed on a left side with respect to an advancing direction of the mobile apparatus #2 that advances on the route #2. Thus, as indicated in a section Tc1, the antenna portion A1 selects a beam whose angle difference in the left direction is large with respect to the front direction as the mobile apparatus #2 approaches the antenna portion A1.

The antenna portion A2 is installed on a right side with respect to the advancing direction of the mobile apparatus #2 that advances on the route #2. Thus, as indicated in a section Tc2, the antenna portion A2 selects a beam whose angle difference in the right direction is large with respect to the front direction as the mobile apparatus #2 approaches the antenna portion A2.

The antenna portion A3 is installed on a right side with respect to the advancing direction of the mobile apparatus #2 that advances on the route #2. The antenna portion A3 is installed in a distant position from the route #2 compared to the antenna portion A1 and the antenna portion A2. Thus, as for the antenna portion A3, the timing when communication starts is delayed compared to the antenna portion A1 and the antenna portion A2. As indicated in a section Tc3, compared to the antenna portion A1 and the antenna portion A2, the antenna portion A3 has a short section where the front direction is selected and has a long section where the beam whose angle difference in the right direction is large with respect to the front direction is selected. Further, as for the antenna portion A3, the timing when communication finishes is early compared to the antenna portion A1 and the antenna portion A2.

As described above, in a case where the antenna portions are installed between the respective neighboring routes for four routes, the histories of the beams are different in accordance with the positional relationships between the communication areas formed by the plural antenna portions and the routes. The RSU 30 may assess the route on which the mobile apparatus which has the OBU 20 travels based on the antenna portion among the plural antenna portions that performs wireless communication with the OBU 20 and on the history of the beams of the antenna portion. Alternatively, the RSU 30 may assess the route on which the mobile apparatus which has the OBU 20 travels based on the history of the beams of each of the plural antenna portions.

Modification Example 4

Note that in the above-described examples, a description is made about an example where the RSU 10 assesses the route on which the mobile apparatus which has the OBU 20 travels based on the history of the beams used for wireless communication with the OBU 20. However, the present disclosure is not limited to this. In the following, a description will be made about a modification example 4 where the OBU 20 assesses the route on which the mobile apparatus which has the OBU 20 travels based on the history of the beams used for wireless communication with the RSU 10.

A wireless communication system in the modification example 4 is similar to the wireless communication system illustrated in FIG. 2. Note that FIG. 2 illustrates the example where the RSU 10 performs the beam sweeping. However, in this modification example 4, the RSU 10 does not perform the beam sweeping but may form a non-directional beam, for example.

Figure 15:
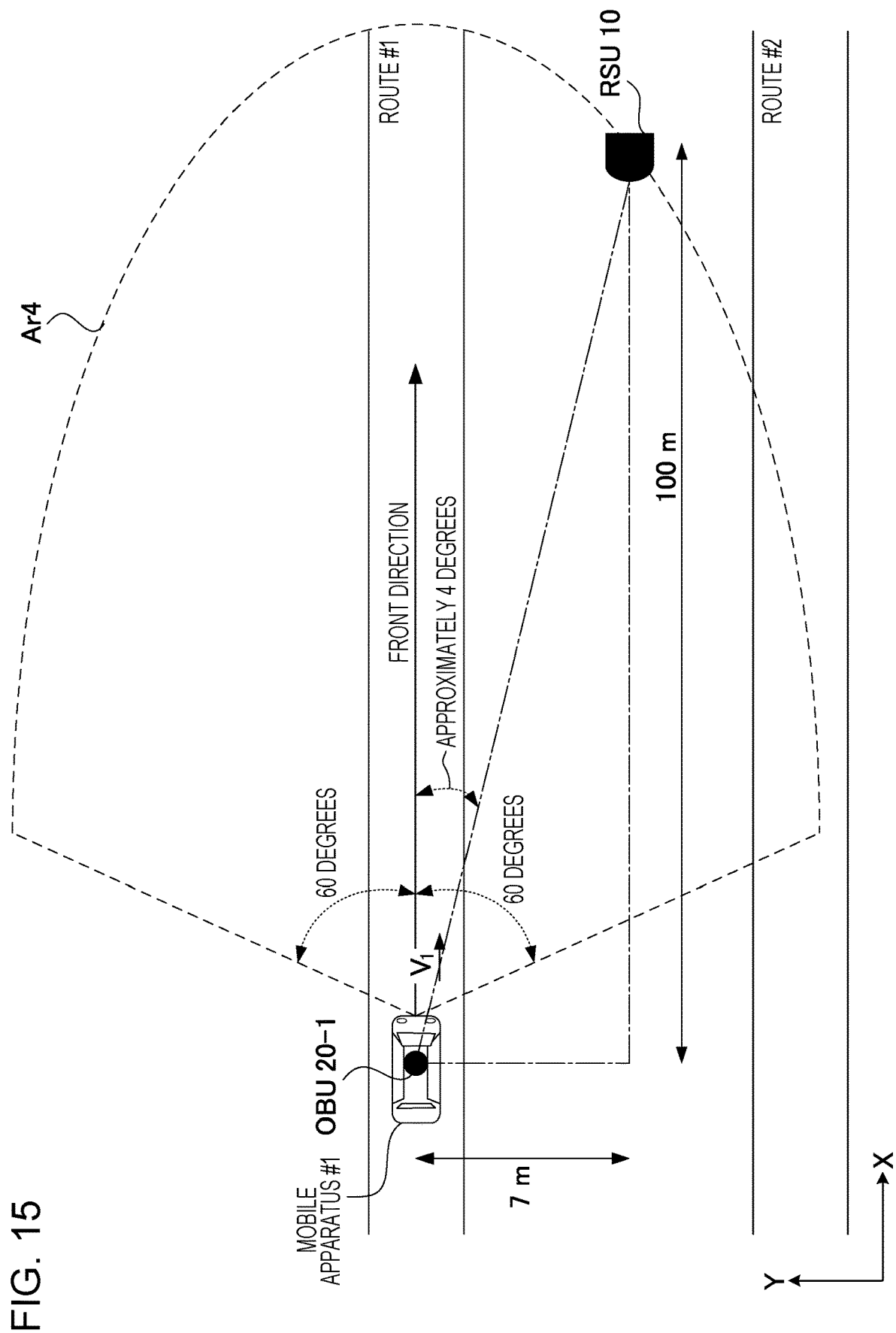
FIG. 15 is a diagram that illustrates one example of the positional relationship between a beam formed by the OBU and the RSU.

FIG. 15 is a diagram that illustrates one example of the positional relationship between the beam formed by the OBU 20 and the RSU 10.

In FIG. 15, the OBU 20-1 of the mobile apparatus #1 that travels on the route #1 forms a communication area Ar4 that has an angle range of 120 degrees which has the position of the OBU 20-1 as the center and includes a range of 60 degrees in the left direction and a range of 60 degrees in the right direction with respect to the front direction.

In FIG. 15, for example, in the position where the mobile apparatus #1 advances and the RSU 10 enters the communication area Ar4, the distance between the OBU 20-1 and the RSU 10 along the axis of the front direction is 100 m, and the distance between the axis of the front direction and the RSU 10 is 7 m. In this case, because Arctan(7 [m]/100 [m]) is approximately 4 degrees, the RSU 10 is present in the position offset by approximately 4 degrees with respect to the front direction of the OBU 20-1.

Here, in a case where the OBU 20-1 forms the beams in 33 directions in the communication area Ar4 with the angle range of 120 degrees, the interval between the neighboring beams of 33 beams is 120 [degrees]/(33−1)=3.75 degrees.

In such a condition, at a stage where the RSU 10 enters the communication area Ar4, the RSU 10 is present substantially in the front direction of the OBU 20-1. Then, at a stage where the RSU 10 enters the communication area Ar4, the OBU 20-1 forms the beam (beam #0) in the front direction or a beam whose angle difference from the front direction is small (for example, the beam #1–R) and performs wireless communication with the RSU 10.

Then, in the position where the mobile apparatus #1 travels but the RSU 10 does not yet leave the communication area Ar4, the RSU 10 is positioned in an end portion in the right direction of the communication area Ar4.

In such a condition, at a stage where the RSU 10 does not yet leave the communication area Ar4, the OBU 20-1 forms the beam whose angle difference in the right direction is largest with respect to the front direction, for example, and performs wireless communication with the RSU 10.

As described above, the OBU 20-1 changes the beams formed for performing wireless communication with the RSU 10 in accordance with the positional relationship among the route #1, the position of the RSU 10, and the communication area formed by the OBU 20-1. Further, similarly, the OBU 20-2 provided to the mobile apparatus #2 that travels on the route #2 changes the beams formed for performing wireless communication with the RSU 10 in accordance with the positional relationship among the route #2, the position of the RSU 10, and the communication area formed by the OBU 20-2. The OBU 20 assesses the route on which the mobile apparatus which has the OBU 20 travels based on the history of the beams.

Next, a description will be made about examples of the history of the beams and assessment based on the history of the beams in this modification example 4.

FIG. 16A is a diagram that illustrates one example of the history of the beams formed for the RSU 10 by the OBU 20-1 of the mobile apparatus #1 that travels on the route #1 in FIG. 15. FIG. 16B is a diagram that illustrates one example of the history of the beams formed for the RSU 10 by the OBU 20-2 of the mobile apparatus #2 that is not illustrated in FIG. 15 and travels on the route #2.

In FIG. 16A and FIG. 16B, the horizontal axes indicate the position of the OBU 20 that corresponds to the X axis in FIG. 15.

FIG. 16A and FIG. 16B illustrate examples where the horizontal axes are axes that indicate positions of the mobile apparatuses. However, the present disclosure is not limited to this. For example, the horizontal axis may be an axis that indicates time.

In FIG. 16A and FIG. 16B, the vertical axes correspond to the Y axis in FIG. 15 and indicate the index of the beam formed by the OBU 20. For example, on the vertical axes, the indices of the beams in the left and right directions are indicated in order from the smallest angle difference from the front direction while index #0 of the beam in the front direction is set as the reference.

Further, FIG. 16A indicates the index of the beam selected for the position of the mobile apparatus #1 on the X axis.

In a section T11, because the RSU 10 is sufficiently distant from the mobile apparatus #1 and is present in a position that may be assumed to be in almost the front direction, the beam #0 in the front direction or a beam whose angle difference from the front direction is small (for example, the beam #1–R) is selected.

In a section T12, because the mobile apparatus #1 approaches the RSU 10 and the RSU 10 is present in a position where an angle difference is present between the front direction of the mobile apparatus #1 and the right direction, a beam whose angle difference between the front direction and the right direction is large is selected.

FIG. 16B indicates the index of the beam selected for the position of the mobile apparatus #2 on the X axis.

In a section T14, because the RSU 10 is sufficiently distant from the mobile apparatus #2 and is present in a position that may be assumed to be in almost the front direction, the beam #0 in the front direction or a beam whose angle difference from the front direction is small (for example, the beam #1–L) is selected.

In a section T15, because the mobile apparatus #2 approaches the RSU 10 and the RSU 10 is present in a position where an angle difference is present between the front direction of the mobile apparatus #2 and the left direction, a beam whose angle difference between the front direction and the left direction is large is selected.

As illustrated in FIG. 16A and FIG. 16B, the history of the beams is different in accordance with the positional relationship among the communication area formed by the OBU 20, the position of the RSU, and the route. The OBU 20 assesses the route on which the mobile apparatus which has the OBU 20 travels based on the history of the beams.

For example, in wireless communication with the OBU 20, the RSU 10 notifies the OBU 20 of information about the position of the RSU 10. For example, the notified information may be information that indicates the positional relationship between the position in which the RSU 10 is installed and the route. For example, the notified information may be information that indicates that the RSU 10 is on a right side of the route #1 with respect to the advancing direction and on a left side of the route #2.

For example, in a case where the beam selected last time in wireless communication with the RSU 10 is the beam in the right direction, the OBU 20 assesses that the RSU 10 is present on a right side with respect to the advancing direction of the mobile apparatus. Then, the OBU 20 assesses that the mobile apparatus that has the OBU 20 travels on the route #1 based on the notified information from the RSU 10.

Further, for example, in a case where the beam selected last time in wireless communication with the RSU 10 is the beam in the left direction, the OBU 20 assesses that the RSU 10 is present on a left side with respect to the advancing direction of the mobile apparatus. Then, the OBU 20 assesses that the mobile apparatus that has the OBU 20 travels on the route #2 based on the notified information from the RSU 10.

In such a manner, the OBU 20 assesses the positional relationship between the advancing direction of the mobile apparatus that has the OBU 20 and the RSU 10 based on the history of the beams that is different in accordance with the positional relationship between the communication area formed by the OBU 20 and the route and assesses the route on which the mobile apparatus which has the OBU 20 travels based on the notified information from the RSU 10.

<Flowchart of OBU>

Figure 17:
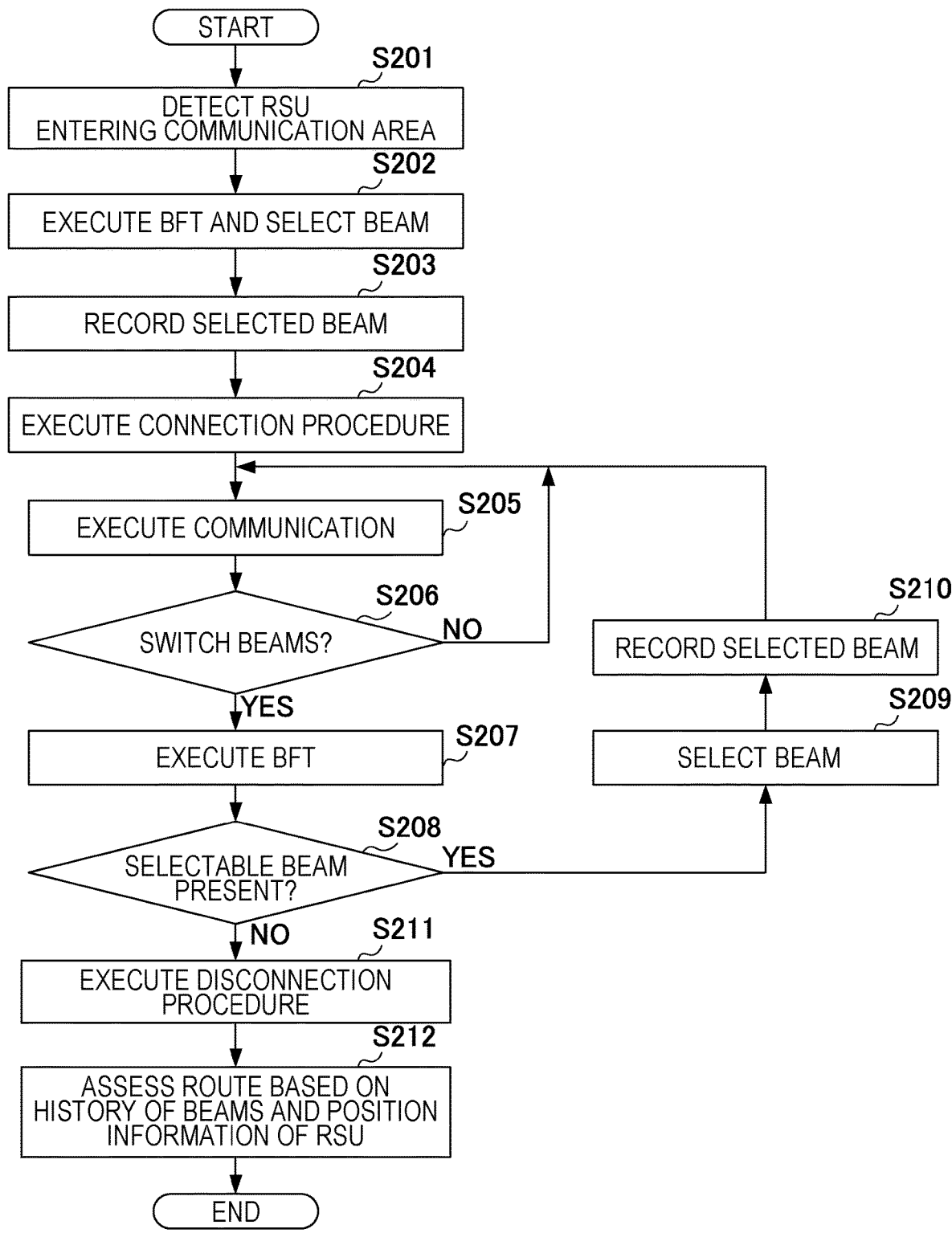
FIG. 17 is a flowchart that illustrates a process by the OBU in a modification example 4 of one embodiment of the present disclosure.

FIG. 17 is a flowchart that illustrates a process by the OBU in the modification example 4 of this embodiment.

The OBU 20 detects the RSU 10 that enters the communication area Ar (S201). For example, the OBU 20 detects the RSU 10 by receiving a beacon that is regularly transmitted by the RSU 10.

The OBU 20 executes the BFT with the RSU 10 and selects the beam used for communication with the RSU 10 (S202).

The OBU 20 records the selected beam (S203).

The OBU 20 executes a connection procedure with the RSU 10 by using the selected beam (S204).

The OBU 20 executes communication by using the selected beam and performs transmission and reception of data (S205).

After execution of communication, the OBU 20 assesses whether or not the beams used for communication with the RSU 10 are switched (S206). For example, in a case where after execution of the communication, the power of the received signal that is received from the RSU 10 becomes less than a prescribed value at the time when the BFT is executed in S202, the OBU 20 assesses that the beams are switched. In a case where the power of the received signal is the prescribed value or more, the OBU 20 assesses that the beams are not switched.

In a case where the beams are not switched (NO in S206), the flow returns to S205.

In a case where the beams are switched (YES in S206), the OBU 20 executes the BFT with the RSU 10 (S207).

As a result of execution of the BFT, the OBU 20 assesses whether or not a selectable beam is present (S208). For example, in a case where at least any one of the beams formed in the BFT is a usable beam for communication, the OBU 20 assesses that a selectable beam is present.

In a case where a selectable beam is present (YES in S208), the OBU 20 selects the beam (S209).

Then, the OBU 20 records the selected beam (S210). Then, the flow returns to S205.

In a case where a selectable beam is not present (NO in S208), for example, in a case where continuation of communication is difficult even if any beam that may be formed by the OBU 20 is used, the OBU 20 executes a procedure for disconnecting communication with the RSU 10 (S211).

The OBU 20 assesses the route on which the mobile apparatus which has the OBU 20 travels based on the history of the selected beams and information about the position of the RSU 10 (S212). Then, the flow finishes.

Note that the information about the position of the RSU 10 may be acquired from the RSU 10 in execution of communication (for example, S205), may be acquired from the RSU 10 when the RSU 10 is detected (for example, S201), or may be acquired at another timing.

Modification Example 5

In the following, a description will be made about an example where the RSU 10 determines whether or not activation of data processing of data received from the OBU 20 is operated by using a result of an assessment about the route on which the mobile apparatus which has the OBU 20 travels.

<Configuration of RSU>

Figure 18:
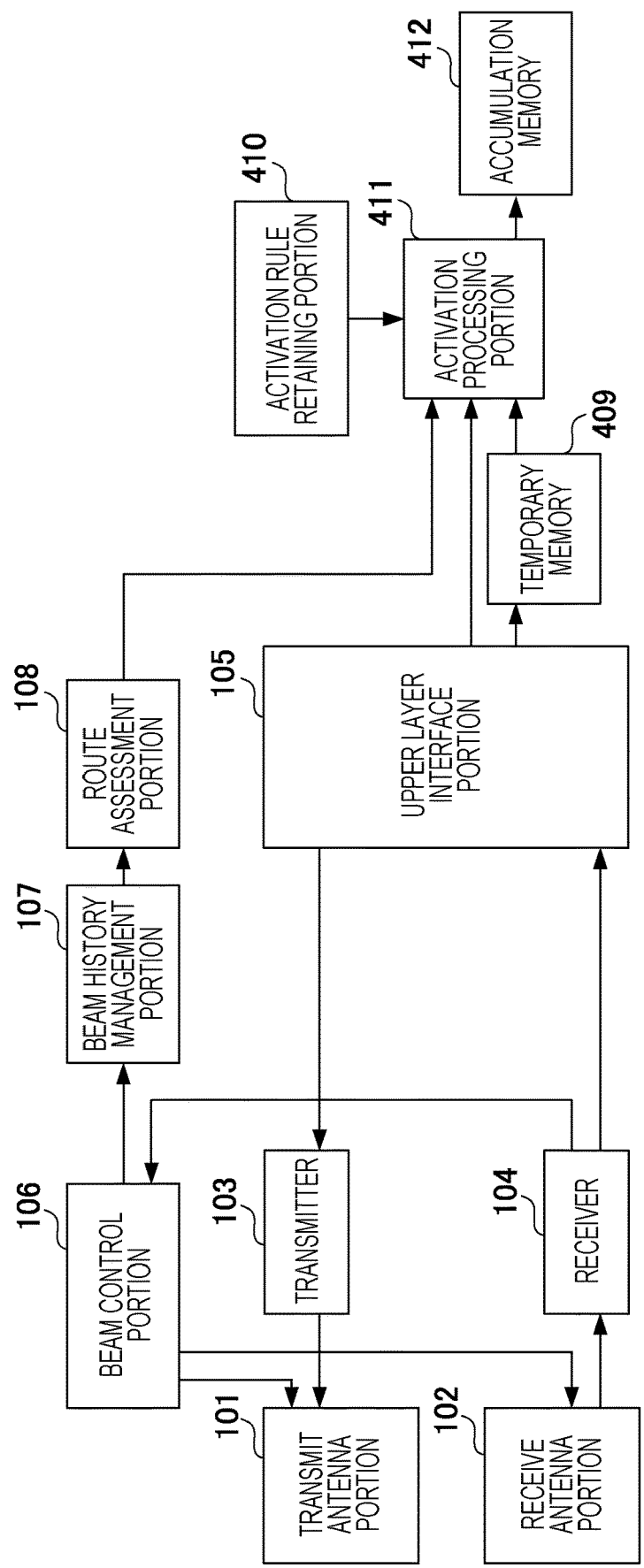
FIG. 18 is a diagram that illustrates one example of a configuration of the RSU according to a modification example 5 of one embodiment of the present disclosure.

FIG. 18 is a diagram that illustrates one example of a configuration of an RSU 40 according to a modification example 5 of this embodiment. Note that in FIG. 18, the same reference numerals are provided to similar configurations to FIG. 3, and descriptions thereof will not be made.

In the RSU 40, a temporary memory 409, an activation rule retaining portion 410, an activation processing portion 411, and an accumulation memory 412 are added to the RSU 10.

The upper layer interface portion 105 outputs information of the OBU 20 whose entrance into the communication area is detected to the activation processing portion 411. Further, the upper layer interface portion 105 outputs data acquired from the OBU 20 to the temporary memory 409.

The temporary memory 409 temporarily retains data that are not yet activated (validated) by the activation processing portion 411.

The activation rule retaining portion 410 retains an activation rule that indicates whether the data acquired from the OBU 20 are validated or invalidated.

The activation processing portion 411 acquires the information of the OBU 20 whose entrance into the communication area is detected and confirms a transmission source of the data to be retained in the temporary memory 409. Then, the activation processing portion 411 assesses whether the data to be retained in the temporary memory 409 is validated or invalidated based on an assessment result of the route assessment portion 108 and the activation rule.

In a case where the data to be retained in the temporary memory 409 are validated, the activation processing portion 411 reads out the data of the temporary memory 409 and outputs the data to the accumulation memory 412. The data of the accumulation memory 412 may be used in the upper layer.

In a case where the data to be retained in the temporary memory 409 are invalidated, the activation processing portion 411 discards the data of the temporary memory 409.

A description will be made in the following about a specific example where the above-described RSU 40 assesses whether the data are validated or invalidated.

A description will be made about an example where the RSU 40 is provided in the position of the RSU 10 illustrated in FIG. 2, for example. In this case, the RSU 40 assesses whether the mobile apparatus that has the OBU 20 travels on the route #1 or travels on the route #2.

For example, the route #1 is a route along which the mobile apparatus traveling via Osaka prefecture passes, and the route #2 is a route along which the mobile apparatus traveling via Niigata prefecture passes.

Further, the OBU 20 of each of the mobile apparatuses retains a situation of the route via which the mobile apparatus travels (for example, a three-dimensional map (3D map) that accumulates information acquired by an in-vehicle radar or an in-vehicle camera during travel). Further, for example, the OBU 20 may acquire the 3D map from the other RSU 40 that is provided in the route via which the mobile apparatus travels and retain the 3D map. Note that the other RSU 40 may have the 3D map acquired from the other mobile apparatus and may download the 3D map, which corresponds to the route along which the OBU 20 of each of the mobile apparatuses passes, to each of the mobile apparatuses.

The OBU 20 of each of the mobile apparatuses enters the communication area of the RSU 40, performs data communication with the RSU 40, and uploads information of the retained 3D map to the RSU 40. The information of the 3D map that is uploaded to the RSU 40 is retained in the temporary memory 409.

In a case where the mobile apparatus leaves the communication area, the RSU 40 performs a disconnecting process from the OBU 20 of the mobile apparatus and assesses the route on which the mobile apparatus travels.

Then, the activation processing portion 411 of the RSU 40 assesses whether the information of the 3D map retained in the temporary memory 409 is validated or invalidated based on an assessment result of the route and the activation rule.

For example, a description will be made about a case where the activation rule is a rule in which the 3D map which is accumulated in the OBU 20 of the mobile apparatus which travels on the route #1 is valid because the route #1 is a route via Osaka prefecture and the 3D map which is accumulated in the OBU 20 of the mobile apparatus which travels on the route #2 is invalid because the route #2 is a route via Niigata prefecture.

In this case, the activation processing portion 411 has different assessment results of valid and invalid for the OBU 20 of the mobile apparatus assessed as traveling on the route #1 and the OBU 20 of the mobile apparatus assessed as traveling on the route #2.

For example, the activation processing portion 411 assesses that the data acquired from the OBU 20 of the mobile apparatus assessed as traveling on the route #1 is valid. For example, the activation processing portion 411 assesses that the data acquired from the OBU 20 of the mobile apparatus assessed as traveling on the route #2 is invalid.

In this case, the data acquired from the OBU 20 of the mobile apparatus assessed as traveling on the route #1 (the information of the 3D map of the OBU 20 of the mobile apparatus traveling via Osaka prefecture) in the data retained in the temporary memory 409 (the information of the 3D map) are output to the accumulation memory 412. Further, the data acquired from the OBU 20 of the mobile apparatus assessed as traveling on the route #2 (the 3D map of the OBU 20 of the mobile apparatus traveling via Niigata prefecture) are discarded.

As described above, an activation process of data is executed based on the assessment result of the route.

Further, the above-described example is a process in which the activation process of data validates or invalidates the data based on the assessment result of the route. However, the present disclosure is not limited to this.

For example, the activation process of data may be a process for sorting the data based on the assessment result of the route. For example, as one example of the activation process, the RSU 40 may select an accumulation memory as an output destination from plural accumulation memories provided in response to the routes based on the assessment result of the route and may output the data acquired from the OBU 20 to the selected accumulation memory.

Further, the activation process of data may be a process for billing based on the assessment result of the route. For example, in a case where the mobile apparatus is assessed as traveling on a specific route, billing may be performed for the identifier (ID) of the mobile apparatus acquired from the OBU 20 of the mobile apparatus. For example, in a case where the route #1 in FIG. 2 is a highway and the route #2 is a local road, the activation process of data may perform billing for the ID of the mobile apparatus acquired from the OBU 20 of the mobile apparatus that is assessed as traveling on the highway (route #1).

Note that in a case where the RSU 40 performs a route assessment, the mobile apparatus on which the OBU 20 is mounted may accept a notification about billing via another communication measure (cellular system or Wi-Fi®). Further, in a case where the OBU 20 performs a route determination, a billing assessment formula (activation rule) is accumulated in the OBU 20 at the same time as uploading of data, or the billing assessment formula is downloaded from the RSU 40 to the OBU 20 by another communication measure, and the OBU 20 may recognize a billing operation after the route assessment.

<Flowchart of RSU>

Figure 19:
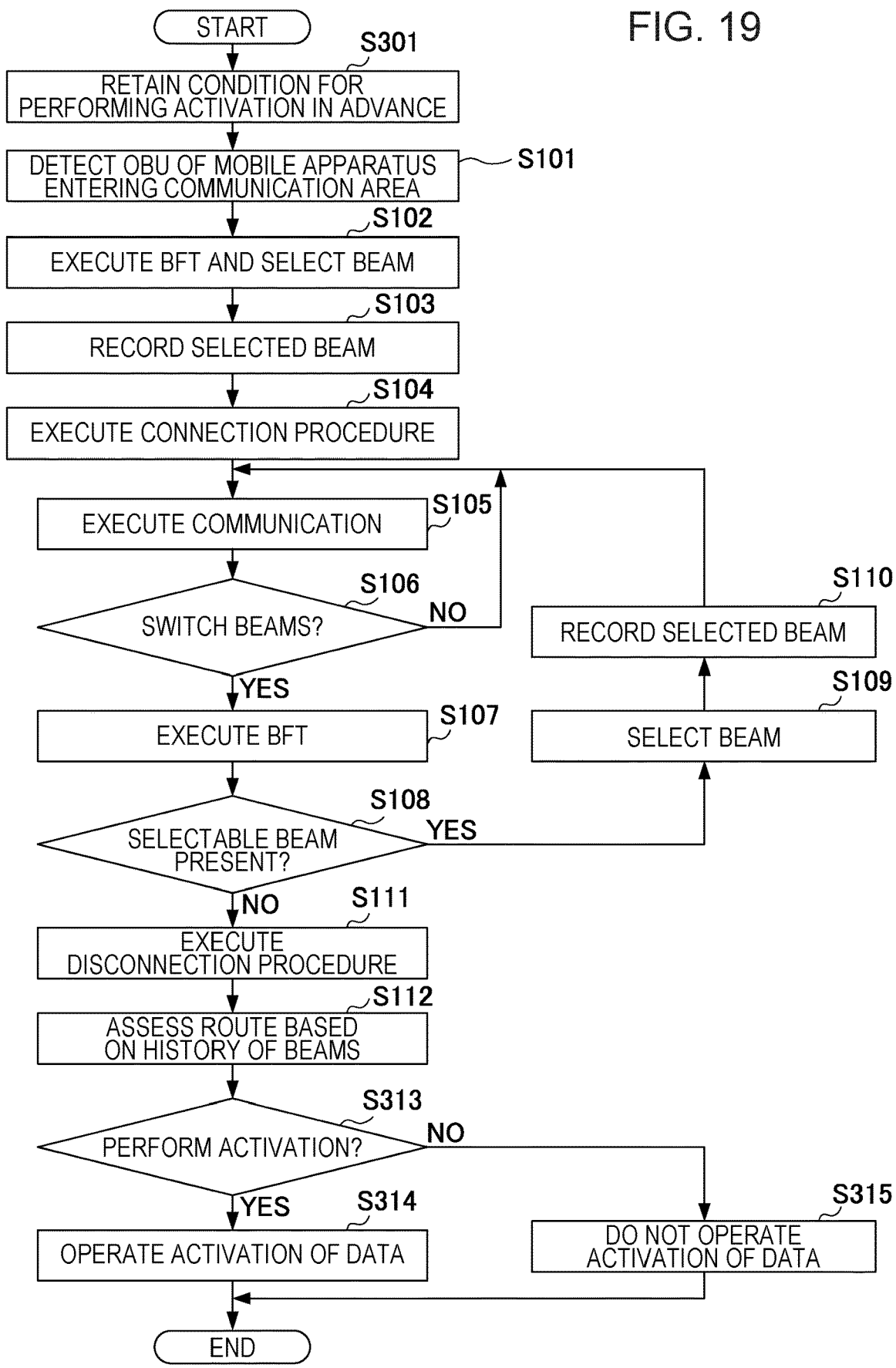
FIG. 19 is a flowchart that illustrates a process by the RSU in the modification example 5 of one embodiment of the present disclosure.

FIG. 19 is a flowchart that illustrates a process by the RSU 40 in the modification example 5 of this embodiment. Note that in FIG. 19, the same reference characters are provided to similar processes to FIG. 7, and descriptions thereof will not be made. In the following, an example where the RSU 40 performs a route determination will be described.

In the flowchart illustrated in FIG. 19, a process previous to S101 of the flowchart illustrated in FIG. 7 and a process subsequent to S112 are added. In the following, the added processes will be described.

The RSU 40 in advance retains an activation condition (S301). Then, the flow moves to S101. The process of S101 to S112 is illustrated in FIG. 7, and a description thereof will thus not be made.

The RSU 40 assesses the route on which the mobile apparatus which has the OBU 20 travels based on the history of the selected beams (S112) and thereafter assesses whether or not the data acquired in communication are validated (activated) based on the assessment result of the route (S313).

In a case where the assessment is made that the data are activated (YES in S313), the RSU 40 activates the data (S314). For example, the RSU 40 moves the data to be activated from the temporary memory 409 to the accumulation memory 412. Then, the flow finishes.

In a case where the assessment is made that the data are not activated (NO in S313), the RSU 40 does not activate the data (S315). For example, the RSU 40 discards the data. Then, the flow finishes.

As described above, the RSU 40 may assess whether or not the data are activated based on the assessment result of the route in the route assessment portion 108.

Note that in the above-described example, the RSU 40 assesses whether or not the uploaded data are activated. However, the present disclosure is not limited to this. For example, as described in the modification example 4, in a case where the OBU 20 assesses the route, the OBU 20 may assess whether or not the downloaded data are activated based on the assessment result. Further, in a case where the OBU 20 assesses that the data are activated, an operation determination result about activation may be transmitted to the RSU 40 by using another line such as a public line.

For example, the OBU described in the modification example 4 may have similar configurations to the temporary memory 409, the activation rule retaining portion 410, the activation processing portion 411, and the accumulation memory 412 of the RSU 40.

Here, a description will be made in the following about a specific example where the OBU assesses whether the data are validated or invalidated.

For example, in the wireless communication system illustrated in FIG. 2, the OBU 20 assesses whether the traveling route of the mobile apparatus that has the OBU 20 is the route #1 or the route #2.

For example, the route #1 is a route along which the mobile apparatus headed for Aomori prefecture passes, and the route #2 is a route along which the mobile apparatus headed for Yamagata prefecture passes. Further, a description will be made about a method, in which the OBU 20 of each of the mobile apparatuses obtains the situation of a road of a regional zone for which the mobile apparatus is then headed (for example, the 3D map), as an example.

The OBU 20 of each of the mobile apparatuses enters the communication area of the RSU 10, performs data communication with the RSU 10, and downloads the information of the 3D map from the RSU 10. The downloaded information of the 3D map is retained in a temporary memory (not illustrated) of the OBU 20. Note that at a stage where the information of the 3D map is downloaded from the RSU 10, the OBU 20 of each of the mobile apparatuses does not yet assess the route of travel. Thus, the information of the 3D map downloaded from the RSU 10 includes both of the information of the 3D map of Aomori prefecture and the information of the 3D map of Yamagata prefecture.

The OBU 20 assesses the route on which the mobile apparatus travels after communication with the RSU 10 is disconnected.

Then, an activation processing portion of the OBU 20 assesses whether the information of the 3D map retained in a temporary memory is validated or invalidated based on the assessment result of the route and the activation rule.

For example, a description will be made about a case where the activation rule is a rule in which the 3D map of a district for which the route on which the mobile apparatus travels is headed is valid and the 3D map of a district for which the route on which the mobile apparatus travels is not headed is invalid.

In this case, the activation processing portion validates different data between a case where the mobile apparatus is assessed as traveling on the route #1 and a case where the mobile apparatus is assessed as traveling on the route #2.

For example, in a case where the mobile apparatus is assessed as traveling on the route #1, the activation processing portion assesses that the information of the 3D map of Aomori prefecture is valid but the information of the 3D map of Yamagata prefecture is invalid. In this case, the information of the 3D map of Aomori prefecture in the data (the information of the 3D map) retained in the temporary memory is output to an accumulation memory, but the information of the 3D map of Yamagata prefecture is discarded.

For example, in a case where the mobile apparatus is assessed as traveling on the route #2, the activation processing portion assesses that the information of the 3D map of Aomori prefecture is invalid but the information of the 3D map of Yamagata prefecture is valid. In this case, the information of the 3D map of Yamagata prefecture in the data (the information of the 3D map) retained in the temporary memory is output to the accumulation memory, but the information of the 3D map of Aomori prefecture is discarded.

As described above, the activation process of data is executed based on the assessment result of the route. Note that the above-described example is an example where the OBU 20 downloads the data from the RSU 40. However, in a case where the OBU 20 also performs the route determination, an example is possible where the OBU 20 uploads the data to the RSU 40.

Further, the above-described example is a process in which the activation process of data validates or invalidates the data based on the assessment result of the route. However, the present disclosure is not limited to this.

For example, the activation process of data may be a process for sorting the data based on the assessment result of the route. For example, as one example of the activation process, the OBU 20 may select an accumulation memory as an output destination from plural accumulation memories provided in response to the routes based on the assessment result of the route and may output the data acquired from the RSU 10 to the selected accumulation memory.

Further, the activation process of data may be a process for billing based on the assessment result of the route. For example, in a case where the RSU 10 transmits communication data that are caused to include information about billing and the OBU 20 assesses that the mobile apparatus travels on a specific route (for example, the route #1 in a case where the route #1 in FIG. 2 is a highway and the route #2 is a local road), the OBU 20 may extract the information about billing included in the data from the RSU 10 and may display the information on a monitor in the mobile apparatus, for example.

In the modification example 5 described above, in a case where the process corresponding to the route is performed for the data for which communication is performed, the process based on the route is not performed in data communication. Thus, more time for data communication may be secured, communication capacity may be increased, data may be declined or selected in accordance with the route of travel, and it thus becomes easy to delete unnecessary data.

Note that in the above-described embodiment and the modification examples thereof, examples are described where the RSU (or the antenna portion of the RSU) is provided between the routes. The present disclosure is not limited to this. For example, the RSU may be attached to a structure provided in the route and may be installed on the route. In this case, the RSU forms the beam in the front direction or a beam whose angle difference from the front direction is small while the mobile apparatus traveling on the route in which the RSU is installed enters the communication area of the RSU and leaves the communication area. The history of the beams indicates that the beam in the front direction is selected for almost the whole section. The RSU may assess the route on which the mobile apparatus travels based on this history of the beams.

Note that in the above-described embodiment and the modification examples thereof, examples are described where two or four routes linearly extend in parallel. The present disclosure is not limited to this. For example, the routes may have a curve or may be provided at mutually different heights. The routes may form a grade-separated intersection. Even in those cases, because the mobile apparatus that has the OBU moves within a specific range, the moving range of the mobile apparatus that has the OBU is narrowed down to the inside of a specific range. In a case where plural routes are included in the communication area of the RSU, the history of the beams that are used by the RSU for wireless communication with the OBU is stipulated for each of the routes. Thus, the RSU assesses the route on which the mobile apparatus having the OBU with which the RSU performs wireless communication based on the history of the beams that is different in accordance with the positional relationship between the route and the communication area formed by the RSU.

Note that in the above descriptions, expressions such as " . . . portion" and " . . . apparatus" may be replaced by another expression such as " . . . circuit (circuitry)", " . . . device", " . . . unit", or " . . . module".

Further, function blocks used in the description of the above embodiment may typically be realized as an LSI that is an integrated circuit. The integrated circuit may control the function blocks used for the description of the above embodiment and include input and output portions. Those may be formed into individual chips or formed into one chip that includes a part or all of the function blocks. Here, the integrated circuit is referred to LSI. However, the integrated circuit may be referred to as IC, system LSI, super LSI, or ultra LSI in accordance with the difference in the degree of integration.

Further, a method of forming the integrated circuit is not limited to LSI, but the integrated circuit may be realized by using a dedicated circuit or a general purpose processor. A field programmable gate array (FPGA), which is programmable after manufacture of LSI, or a reconfigurable processor, in which connection and settings of circuit cells inside the LSI are reconfigurable, may be used.

In addition, in a case where a technique of forming an integrated circuit, which replaces the LSI, emerges from other techniques developed or derived from semiconductor technologies, it is matter of course that the function blocks may be integrated by using the technique. Application of biotechnology and so forth are possible.

Note that the present disclosure is expressible as a wireless communication device or a control method that is executed in a control device. Further, the present disclosure is expressible as a program that causes such a control method to act by a computer. In addition, the present disclosure is expressible as a recording medium that records such a program in a computer-readable state. That is, the present disclosure is expressible in any categories of a device, a method, a program, and a recording medium.

The present disclosure is operable in all kinds of devices, apparatuses, and systems that have a communication function (generically referred to as communication device). Non-limiting examples of communication devices may include telephones (such as cellular phones and smart-phones), tablets, personal computers (PC) (such as laptop PCs, desktop PCs, and notebook PCs), cameras (such as digital still cameras and video cameras), digital players (such as digital audio players and video players), wearable devices (such as wearable cameras, smart watches, and tracking devices), game consoles, digital book readers, telehealth and tele-medicine (remote health care and medicine prescription) devices, transport vehicles or mobile and conveyance transportation with a communication function (such as automobiles, airplanes, and ships), and combinations of the above-described various devices.

Communication devices are not limited to portable or movable devices but include all kinds of devices, apparatuses, and systems that are not portable or are fixed, for example, smart home devices (such as home appliances, lighting apparatuses, smart meters or measurement apparatuses, and control panels), vending machines, and all "things" that may exist on other Internet of things (IoT) networks.

Communication includes data communication by cellular systems, wireless LAN systems, communication satellite systems, and so forth and data communication by combinations of those.

Further, communication devices include devices such as controllers and sensors that are connected or coupled with a communication apparatus which executes a communication function described in the present disclosure. For example, communication devices include controllers and sensors that generate a control signal or a data signal used by a communication apparatus which executes a communication function of a communication device.

Further, communication devices include infrastructure facilities that perform communication with the above non-limiting various devices or control those various devices, for example, base stations, access points, and all other devices, apparatuses, and systems.

In the foregoing, various embodiments have been described with reference to the drawings. However, it is matter of course that the present disclosure is not limited to such examples. It is clear that a person skilled in the art may conceive various modification examples and alternation examples within the scope described in the claims, and it is of course understood that those belong to the technical scope of the present disclosure. Further, configuration elements in the above embodiment may arbitrarily be combined in the scope that does not depart from the gist of the present disclosure.

CONCLUSION OF PRESENT DISCLOSURE

A wireless communication device of the present disclosure is a wireless communication device for a road side zone and includes: a wireless communication circuit that forms beams in plural different directions in a time division scheme in an area which includes plural routes; and a recording circuit that records time transition in the direction of the beam which is used by the wireless communication circuit for wireless communication with a second wireless communication device of a mobile apparatus which moves on any of the plural routes.

The wireless communication device of the present disclosure includes an assessment circuit that assesses the route on which the mobile apparatus moves among the plural routes based on an assessment reference based on a positional relationship between the plural routes and the area and the time transition in the direction of the beam which is recorded in the recording circuit.

The wireless communication device of the present disclosure is provided between a first route and a second route that are parallel with each other, and the assessment circuit assesses which of the first and second routes the mobile apparatus moves on based on an angle indicated by the beam with respect to a reference direction along a direction in which the first and second routes are parallel in the time transition in the direction of the beam.

In the wireless communication device of the present disclosure, the area that is covered by the wireless communication circuit by the beams in the plural directions is asymmetrical with respect to a reference direction along parallel portions of the plural routes.

The wireless communication device of the present disclosure includes a processing circuit that controls whether or not use of data received by the wireless communication is validated based on an assessment result in the assessment circuit.

A wireless communication device of the present disclosure is a wireless communication device that is provided to a mobile apparatus and includes: a wireless communication circuit that forms beams in plural different directions in a time division scheme in an area which includes plural routes; and a recording circuit that records time transition in the direction of the beam which is used by the wireless communication circuit for wireless communication with a second wireless communication device which is positioned in the area in a case where the mobile apparatus is moving on any of the plural routes.

The wireless communication device of the present disclosure includes an assessment circuit that assesses the route on which the mobile apparatus moves among the plural routes based on a positional relationship between the plural routes and the second wireless communication device, an assessment reference based on a positional relationship between the plural routes and the area, and the time transition in the direction of the beam which is recorded in the recording circuit.

The present disclosure is useful for a system that performs communication with a mobile apparatus.

What is claimed is:

1. A wireless communication device for a road side zone, the wireless communication device comprising:
    a wireless communication circuit that forms beams in plural different directions in a time division scheme in an area which includes plural routes;
    a recording circuit that records time transition in a direction of a beam used by the wireless communication circuit for wireless communication with a second wireless communication device of a mobile apparatus which moves on any of the plural routes; and
    an assessment circuit that assesses a route on which the mobile apparatus moves among the plural routes based on an assessment reference that is based on a positional relationship between the plural routes and the area and the time transition in the direction of the beam recorded in the recording circuit, wherein:
        the wireless communication device is provided between a first route and a second route that are parallel to each other, and
        the assessment circuit assesses on which of the first and second routes the mobile apparatus moves based on an angle made by the beam with respect to a reference direction along a direction in which the first and second routes are parallel in the time transition in the direction of the beam.

2. The wireless communication device according to claim 1, wherein
the area that is covered by the wireless communication circuit by the beams in the plural directions is asymmetrical with respect to a reference direction along parallel portions of the plural routes.

3. A wireless communication device for a road side zone, the wireless communication device comprising:
a wireless communication circuit that forms beams in plural different directions in a time division scheme in an area which includes plural routes;
a recording circuit that records time transition in a direction of a beam used by the wireless communication circuit for wireless communication with a second wireless communication device of a mobile apparatus which moves on any of the plural routes;
an assessment circuit that assesses a route on which the mobile apparatus moves among the plural routes based on an assessment reference that is based on a positional relationship between the plural routes and the area and the time transition in the direction of the beam which is recorded in the recording circuit; and
a processing circuit that controls whether or not use of data received by the wireless communication is validated based on an assessment result of the assessment circuit.

4. A wireless communication device that is provided to a mobile apparatus, the wireless communication device comprising:
a wireless communication circuit that forms beams in plural different directions in a time division scheme in an area which includes plural routes;
a recording circuit that records time transition in a direction of a beam used by the wireless communication circuit for wireless communication with a second wireless communication device positioned in the area in a case where the mobile apparatus is moving on any of the plural routes;
an assessment circuit that assesses a route on which the mobile apparatus moves among the plural routes based on a positional relationship between the plural routes and the second wireless communication device, an assessment reference based on a positional relationship between the plural routes and the area, and the time transition in the direction of the beam which is recorded in the recording circuit; and
a processing circuit that controls whether or not use of data received by the wireless communication is validated based on an assessment result of the assessment circuit.

* * * * *